United States Patent [19]

Takamatsu

[11] Patent Number: 5,452,298

[45] Date of Patent: Sep. 19, 1995

[54] DIGITAL CONFERENCE TRUNK SYSTEM

[75] Inventor: Naoya Takamatsu, Kawasaki, Japan

[73] Assignee: Fujitsu Limited, Kanagawa, Japan

[21] Appl. No.: 120,967

[22] Filed: Sep. 13, 1993

[30] Foreign Application Priority Data

Sep. 14, 1992 [JP] Japan .................. 4-245006

[51] Int. Cl.6 .............................. H04M 3/56
[52] U.S. Cl. ........................ 370/62; 377/202
[58] Field of Search ............ 370/62, 68, 61, 68.1, 370/66, 77, 79, 110.1, 58.1–58.3; 379/202, 206, 207; 348/15, 16

[56] References Cited

U.S. PATENT DOCUMENTS

| | | | |
|---|---|---|---|
| 4,607,362 | 8/1986 | Vary et al. | 370/62 |
| 5,007,049 | 4/1991 | Ohtsuka | 370/62 |
| 5,054,021 | 10/1991 | Epps | 379/202 |
| 5,128,989 | 7/1992 | Nomura | 370/62 |

FOREIGN PATENT DOCUMENTS 61-193553 8/1986 Japan .

*Primary Examiner*—Melvin Marcelo
*Assistant Examiner*—Ajit Patel

[57] ABSTRACT

A low cost digital conference trunk system of the simple construction with a smaller volume, which uses a single memory both as a memory for holding input highway data and a memory for holding output highway data by address operation and timing control.

7 Claims, 21 Drawing Sheets

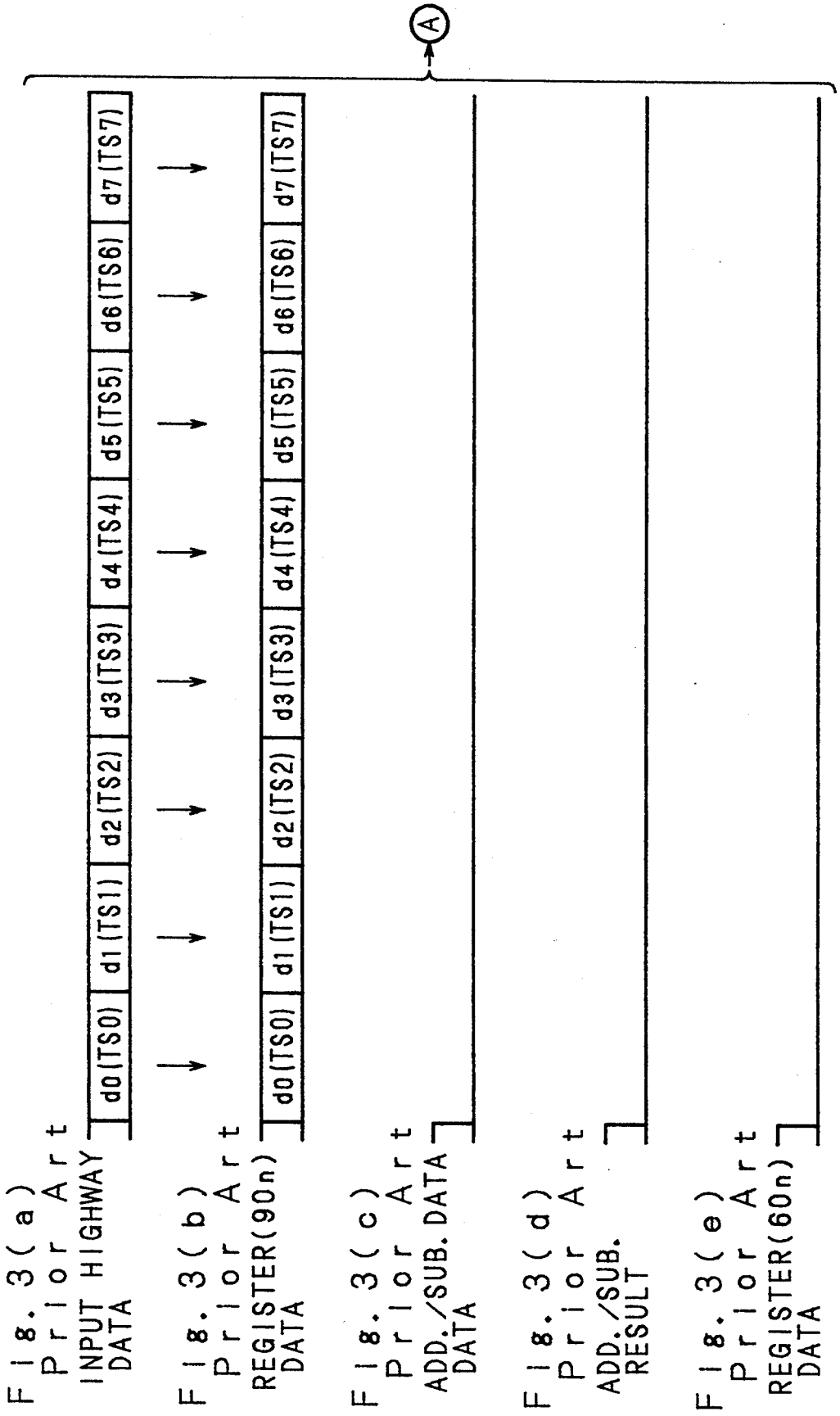

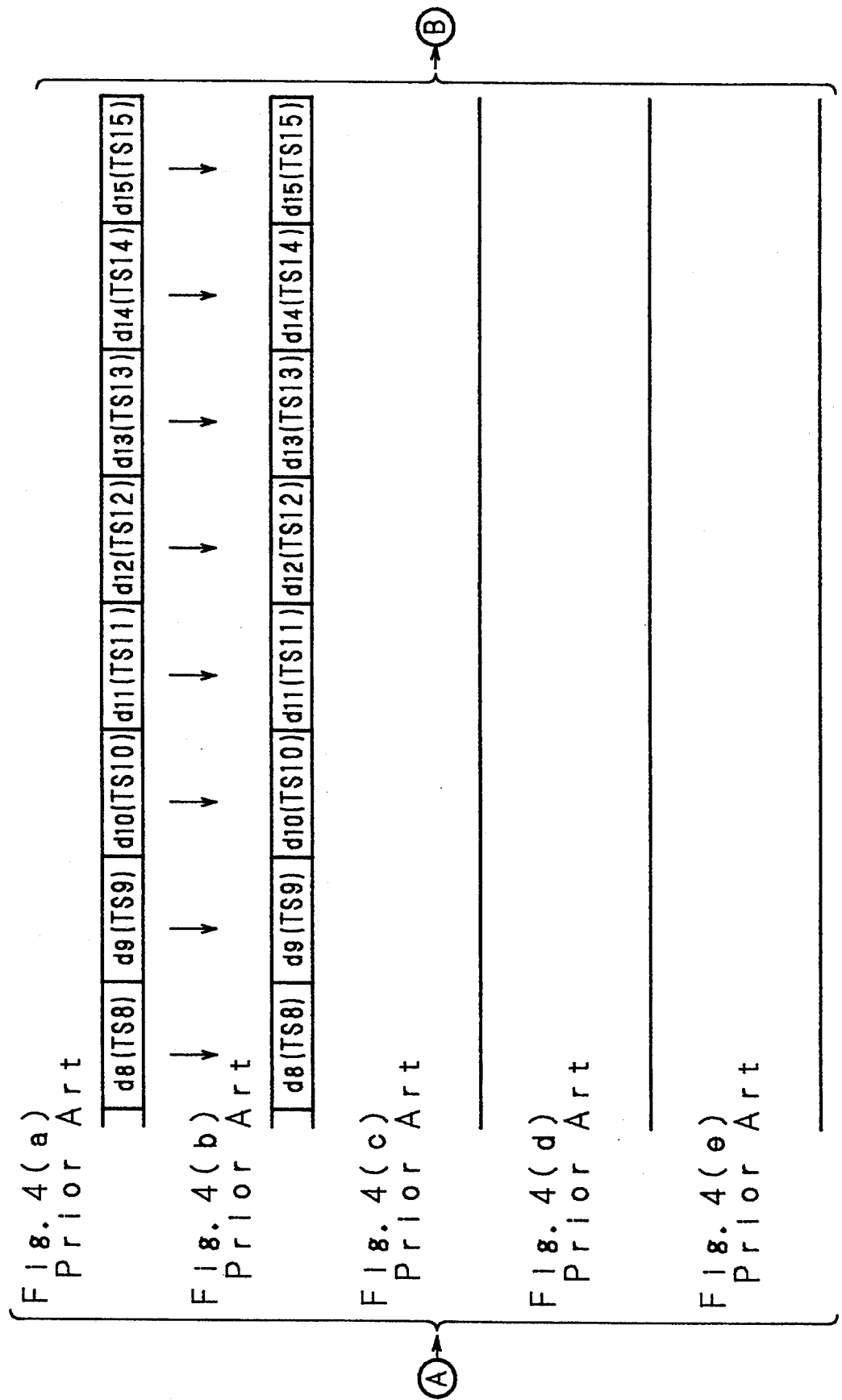

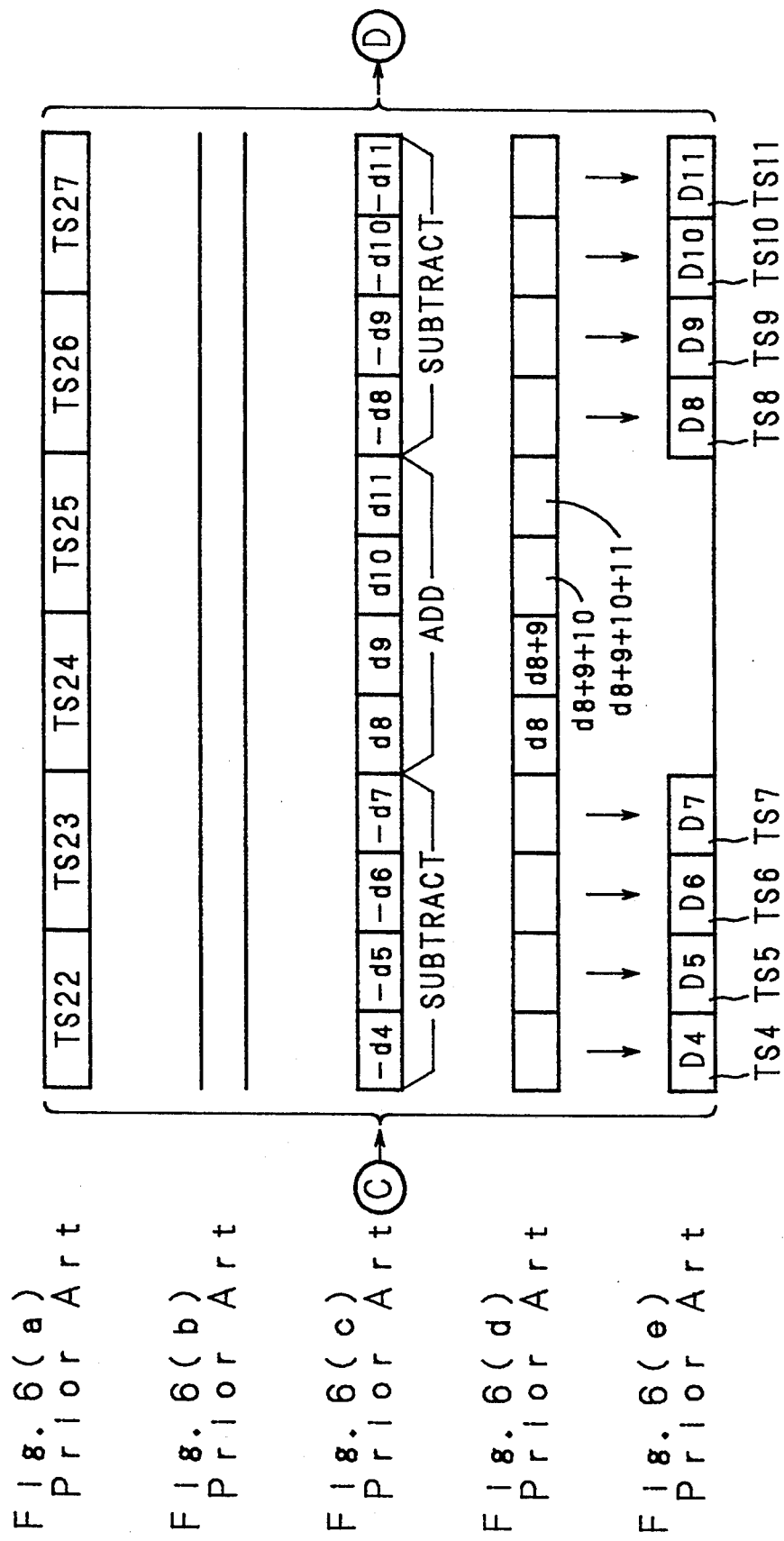

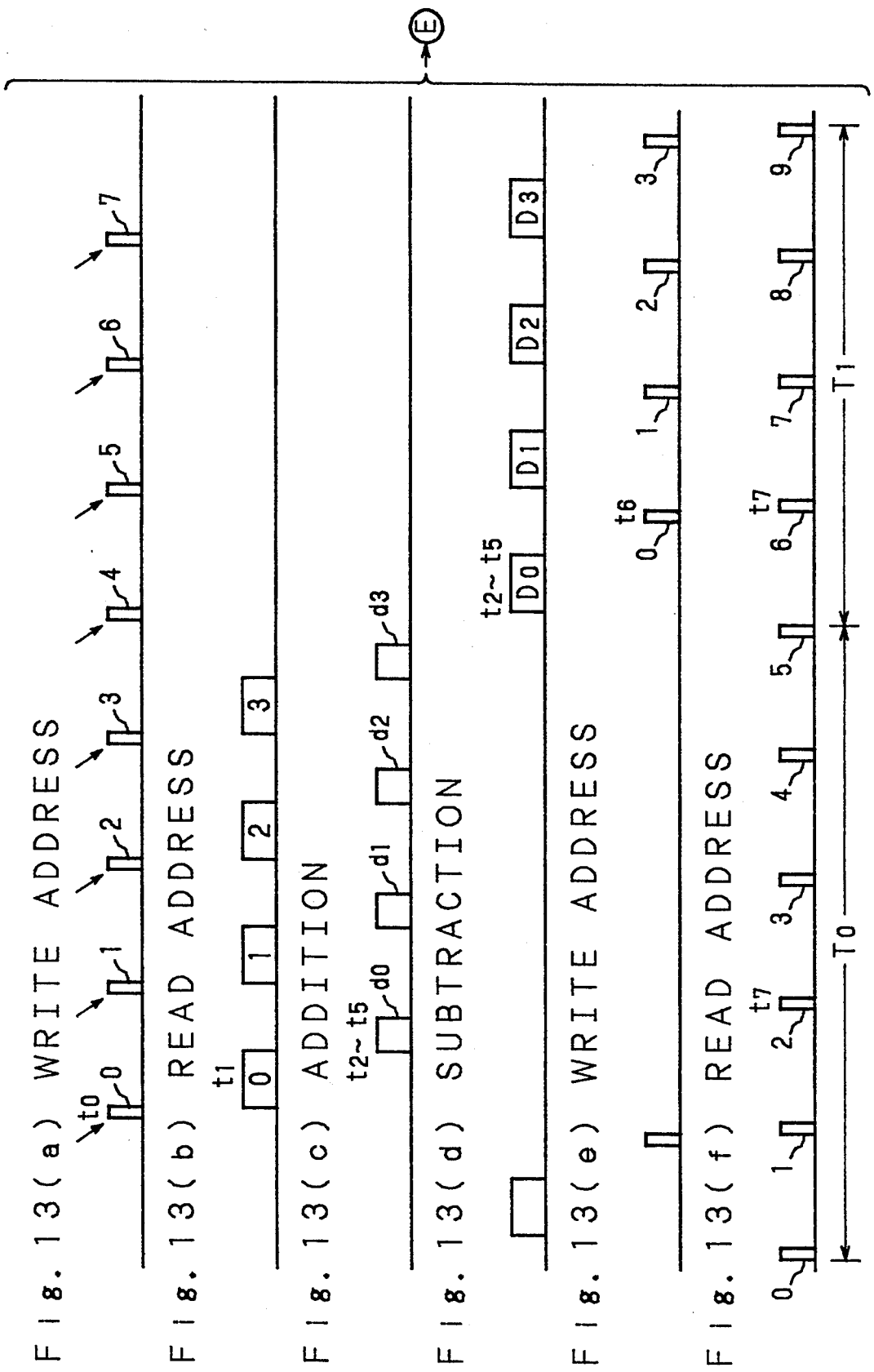

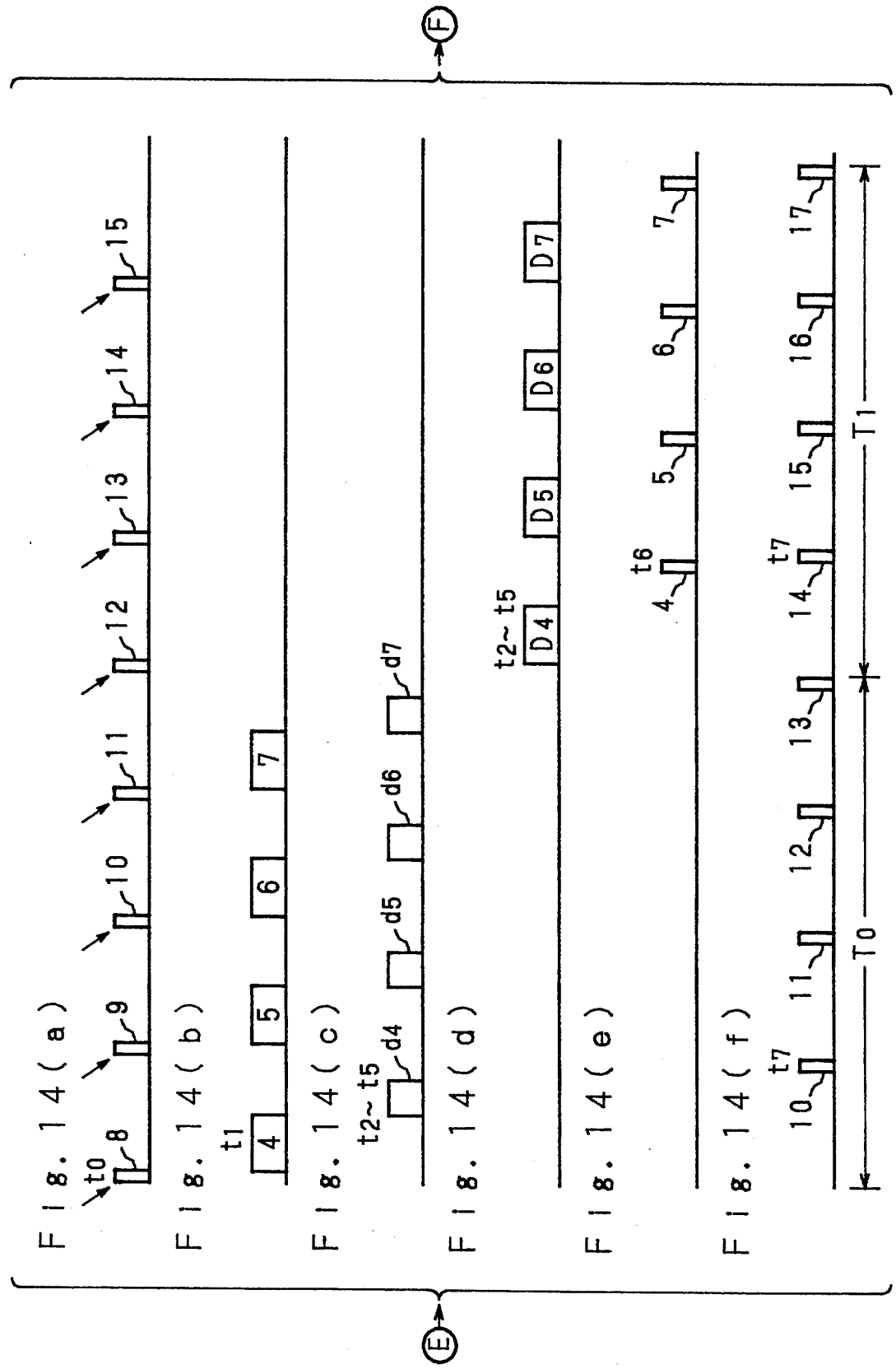

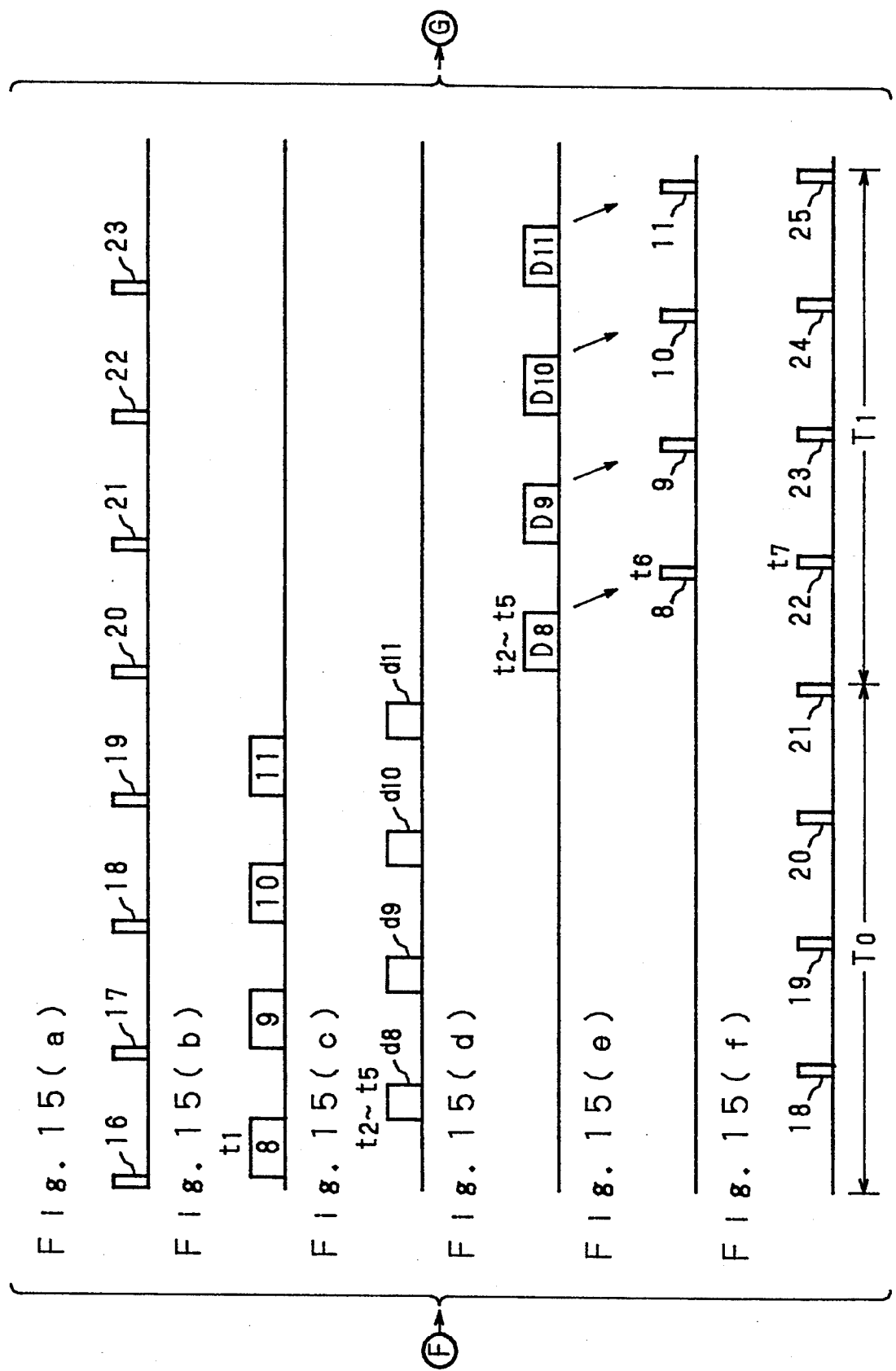

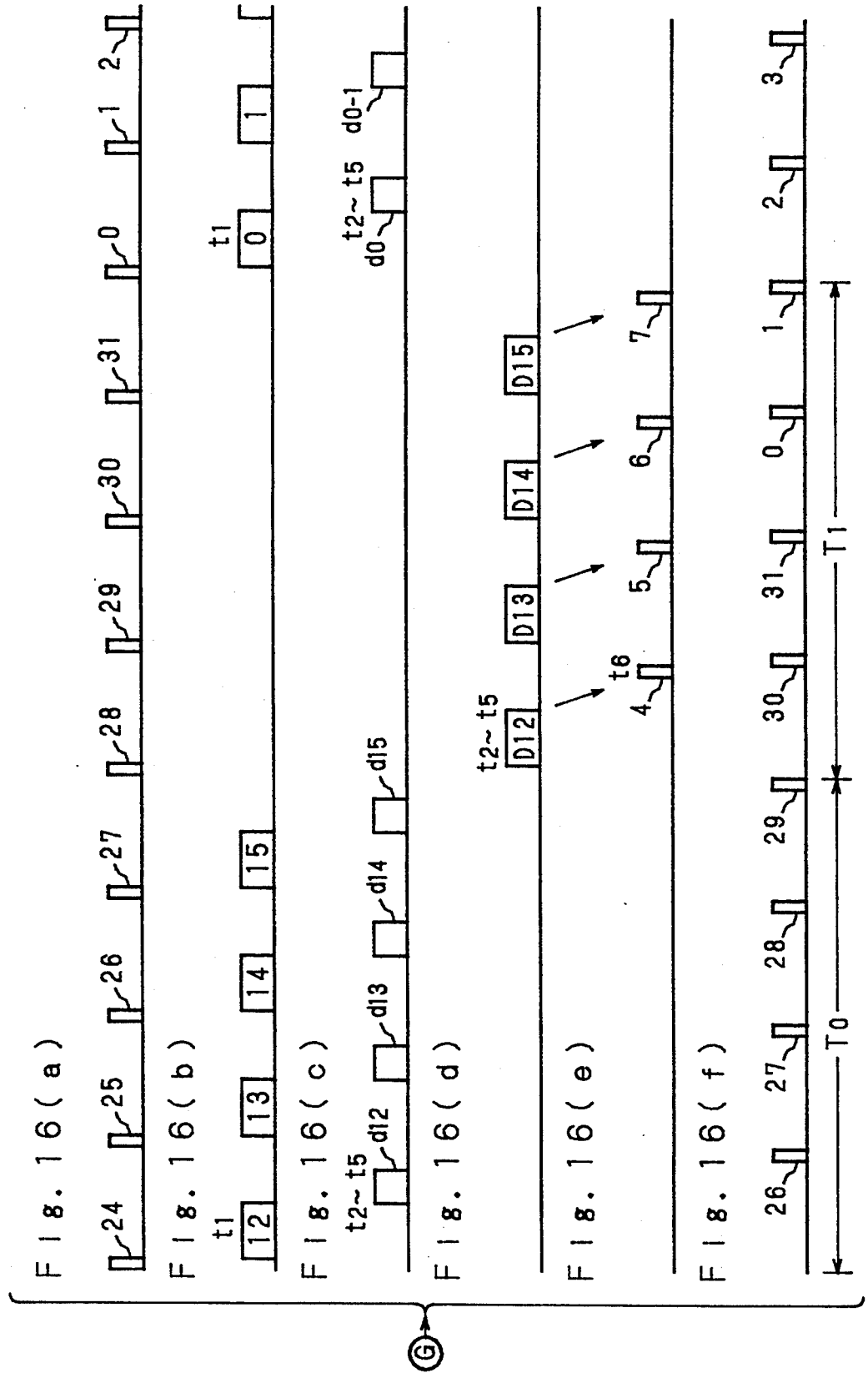

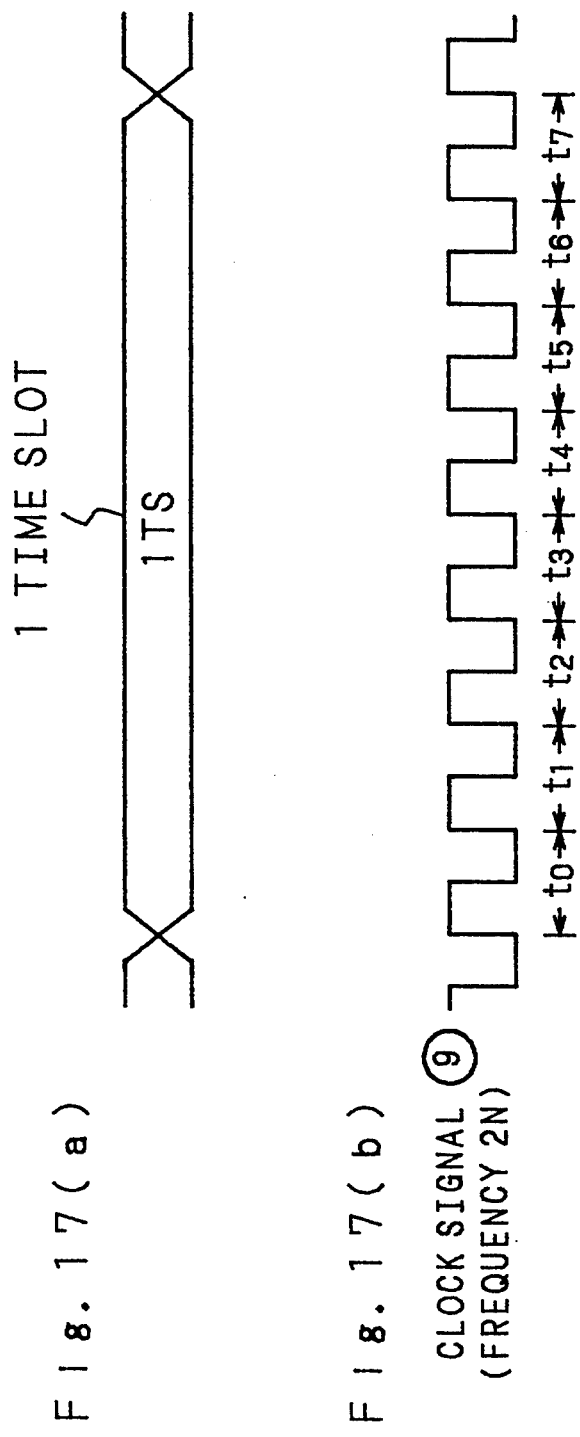

Fig. 17(c)

| DIVISION TIME | $t_0$ | $t_1$ | $t_2$ | $t_3$ | $t_4$ | $t_5$ | $t_6$ | $t_7$ |
|---|---|---|---|---|---|---|---|---|
| ADDITION PERIOD | WRITE | READ DATA CONVERSION | ADDITION | | LATCH TO REGISTER 41 | | | |
| SUBTRACTION PERIOD | | READ DATA CONVERSION | SUBTRACTION | | DATA CONVERSION | | WRITE | OUTPUT |
| GATE SIGNAL | $Y_0$ | | $Y_{06}$ | | | $Y_{45}$ | $Y_6$ | $Y_7$ |

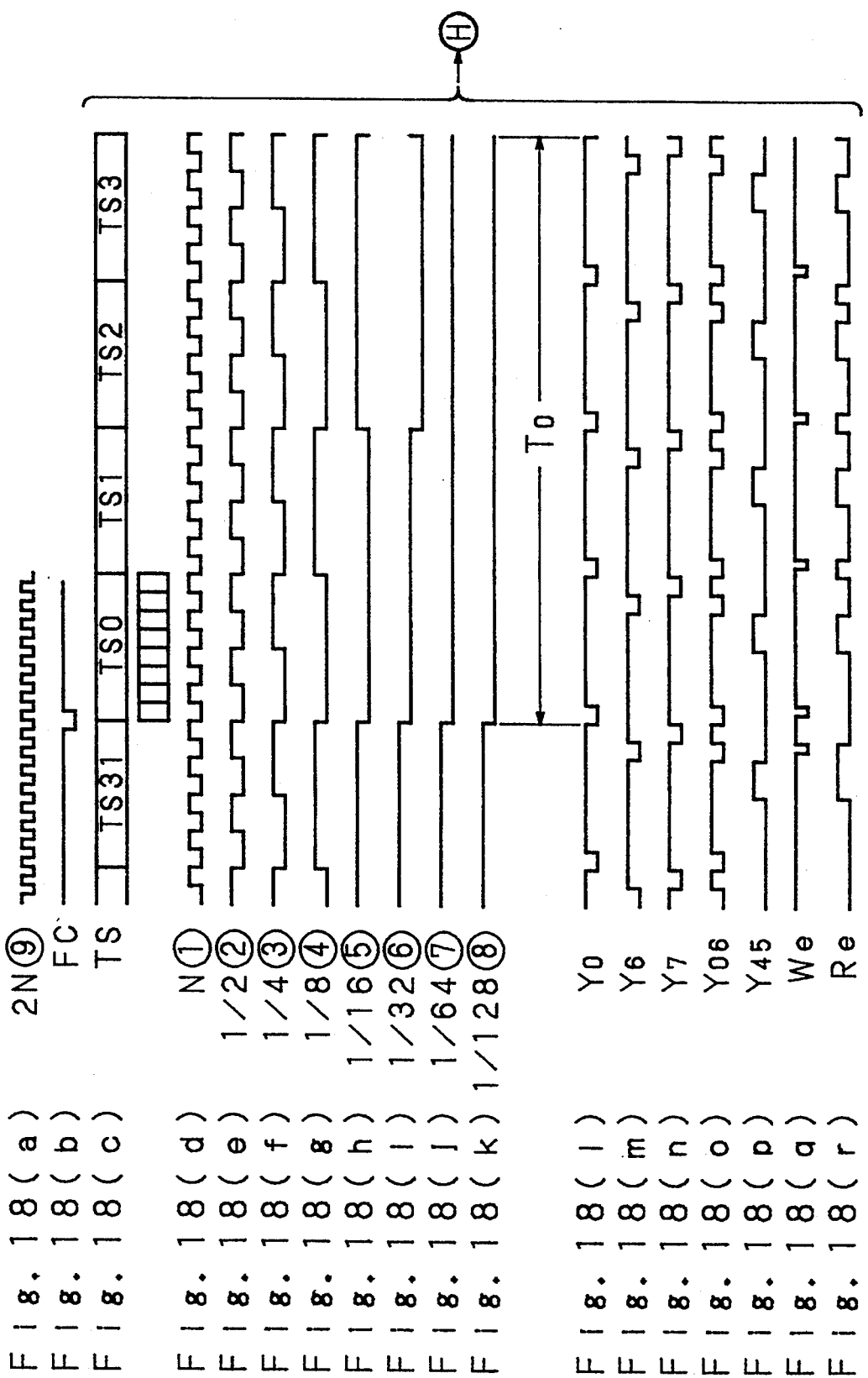

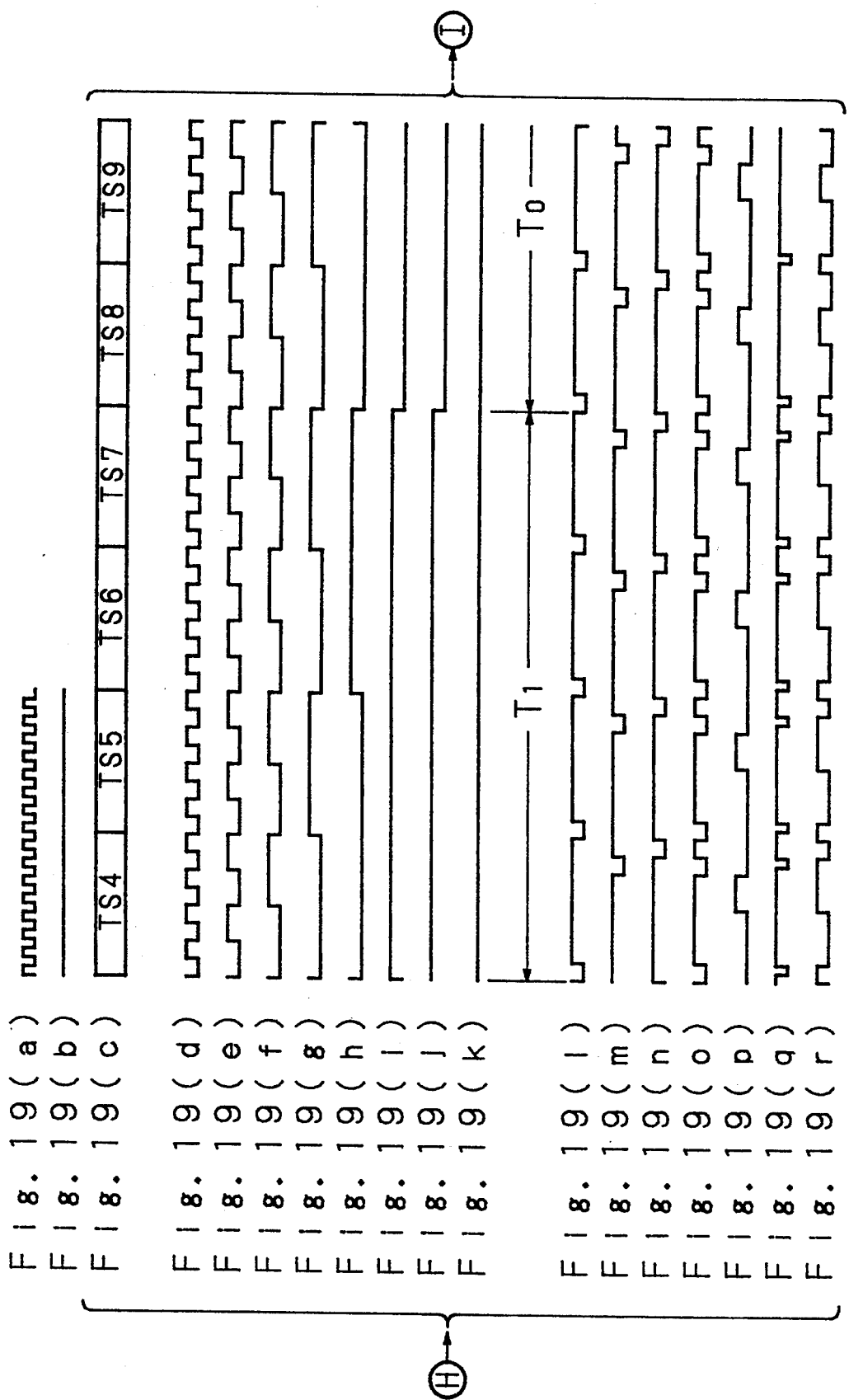

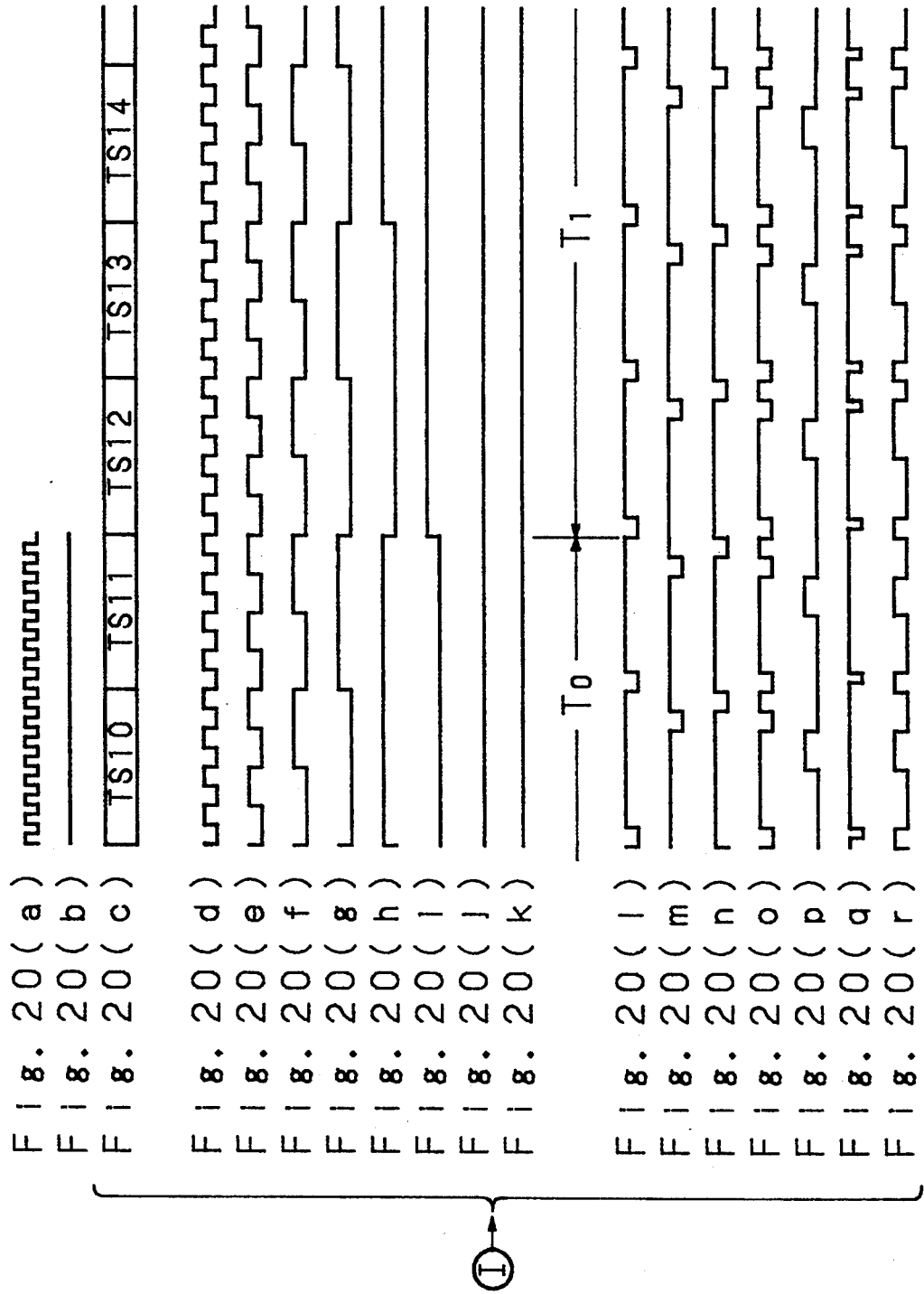

DIGITAL CONFERENCE TRUNK SYSTEM

BACKGROUND OF THE INVENTION

1. Field of the Invention

The present invention relates to a digital conference trunk system and particularly to a digital conference trunk system which employs a memory used both for input and output.

2. Description of the Related Art

FIG. 1 is a block diagram illustrating the basic constitution of a digital exchange. In an ordinary speech between a telephone 101 and a telephone 108, for example, data sent from the telephone 101 passes through a line circuit LC1 and a highway HW and is inputted to a network NW. After the highway HW being connected to the destination telephone circuit by the switching operation of the network NW, the data from the telephone 101 passes the highway HW again and a line circuit LC2, and is received by the telephone 105.

The digital exchange is of time-division switching type, where time-division multiplexed serial data of a plurality of circuits is carried in the highway HW, with a time slot allocated to each telephone circuit. The serial data is input ted to the line circuits LC1 or LC2, or to a conference trunk equipment TRK.

In an add-on with the conference trunk equipment TRK among telephones 101, 102 and 105 For example, data sent from each telephone circuit passes through the highway HW to be inputted to the network NW and, after the highway HW is connected to the destination telephone circuit by the switching operation of the network NW, the data from each telephone circuit is inputted to the conference trunk equipment TRK to be mixed. After being mixed, the data is sent via the network NW and the line circuits LC1 and LC2 again, and data from the telephones 102 and 105 is received by the telephone 101, data from the telephones 101 and 105 is received by the telephone 102, and data from the telephones 101 and 102 is received by the telephone 105.

In addition to the use in such a conference as described above, the conference trunk equipment may be used in an attendant transfer by an operator in a hotel or the like, where among an outside line, the operator and a telephone in a guest room temporarily form an add-on condition when the operator transfers data received from the outside line to the guest room.

FIG. 2 is a block diagram illustrating an outline of a conventional digital conference system. FIG. 3 through FIG. 7 are timing charts thereof.

Input highway data dn (n: 0, 1, ..., 15) is serially transmitted by a time slot TSn (8 bits per 1 time slot) with a band width of a quarter of a specified frequency N (if N=1MHz, for example, N/4=256KHz) and is serially stored in shift registers $90n$. Because eight bits are transmitted by one time slot, data is shifted in a direction from $90_{15}$ to $90_{14}$ to $90_{13}$, and so on bit by bit by the main clock having a frequency 2N (if N=1MHz, for example, 2N=2MHz).

When all pieces of data of 16 time slots TS0 through TS15 are stored in the respective shift registers $90_0$, $90_1$, ..., $90_{15}$ (FIG.3(b), FIG.4(b)), a data selector 80 reads data of P time slots (P is the number of circuits which can attend a conference supported by a conference system), that is the data $d_0$, $d_1$, $d_2$, $d_3$ of the time slots TS0, TS1, TS2, TS3 from the respective shift registers $90_0$ through $90_3$ in the example, in a period of two time slots (FIG. 5 (a)), to input the read data to an addition/subtraction circuit 70 via a P/L conversion means 30a, which converts data from PCM to linear (FIG. 5(c)). The addition/subtraction circuit 70 adds up the input highway data dn successively to obtain the sum $da = d_0 + d_1 + d_3 + d_3$ in the time snot TS17.

In the following two time slots (TS18, TS19), the sum da and the data $d_0$, $d_1$, $d_2$, $d_3$ of each slot are used to calculate the output highway data $D_0 = d_1 + d_2 + d_3$, $D_0 = d_1 + d_2 + d_3$, $D_2 = d_0 + d_1 + d_3$, $D_3 = d_0 + d_1 + d_2$, which are to be outputted in the respective time slots (TS0 through TS3).

The output highway data Dn thus calculated is temporarily stored in output shift registers $60n$ via an L/P conversion means 30b, which converts data from linear to PCM. At this time, upon receipt of a signal from a decoder 40, the shift registers $60n$ are opened in the order from $60_0$ to $60_1$ to $60_2$ and so on, to store the specified output highway data Dn in the specified registers $60n$.

Then the input highway data $d_4$ through $d_7$ of the subsequent four slots (TS4, TS5, TS6, TS7) are processed to obtain output data $D_4 = d_5 + d_6 + d_7$, $D_5 = d_4 + d_6 + d_7$, $D_6 = d_4 + d_5 + d_7$, and $D_7 = d_4 + d_5 + d_6$ which is to be outputted to the corresponding register $60n$ (time slots TS20 through TS23). Remaining two sets of highway data ($d_8$ through $d_{11}$) and ($d_{12}$ through $d_{15}$) are also processed successively in the time slots (TS24 through TS27) and (TS28 through TS31).

When all shift registers $60_0$ through $60_{15}$ receive the output highway data Dn, the data is sequentially outputted by shifting the shift registers $60n$, and the next input highway data dn is inputted at the same time.

Usually, two sets of the unit described above are installed, with one shift register 60 processing the highway data of the time slots 0 through 15 and another unit processing the highway data of the time slots 16 through 31.

In FIG. 2, various timing signals are generated in a clock generator 50.

In the above case, a conference trunk is a four circuits set. When a conference trunk is formed of an eight circuits set, input highway data dn of eight time slots is read at a time and is subjected to addition/subtraction operations, instead of data dn of four time slots.

The principle of switching the trunk equipment of the four circuits set to the trunk equipment of the eight circuits set, is to change the timing signal which controls the selector 80.

According to the conventional system provided with shift registers $90n$, $60n$ (buffer memories) provided on the input and output sides as above, the input side shift register $90n$ converts the input highway data dn to parallel data by sequentially shifting the data which is inputted as serial data, while the output side shift register $60n$ outputs the output highway data Dn as serial data by shifting the data which is inputted as parallel data. Therefore, because the shift registers $90n$ and $60n$ have different functions, both the registers cannot be replaced with a single memory.

As a result, the system has such a defect as to require buffer memories on the input side and the output side, respectively, which results in greater size and higher costs.

Also switching the trunk equipment for four circuits to that for eight circuits requires to change the timing signals outputted from the timing circuit 50. However, such switching construction with the conventional circuit requires too many parts to be mounted on a package. So that, two packages for the four circuits and eight circuits are separately prepared which are selected by a switch. This results in the system of further larger size and with larger number of parts, thereby to raise manufacturing cost.

SUMMARY OF THE INVENTION

The present invention has been made to solve such problems as described above, and has for its object to provide a conference trunk system which uses a single memory both as a memory for temporarily storing data which is inputted From a plurality of circuits via a highway and as a memory for temporarily storing data which is to be outputted to the respective circuits after addition and subtraction, by means of address operation, thereby to simplify the constitution with a less volume of a low price.

The above and further objects and features of the invention will more fully be apparent from the following detailed description with accompanying drawings.

BRIEF DESCRIPTION OF THE DRAWINGS

FIG. 3(a) is a timing chart of the conventional conference trunk system:

FIG. 3(b) is a timing chart of the conventional conference trunk system;

FIG. 3 (c) is a timing chart of the conventional conference trunk system;

FIG. 3(d) is a timing chart of the conventional conference trunk system;

FIG. 3(e) is a timing chart of the conventional conference trunk system;

FIG. 4(a) is a timing chart of the conventional conference trunk system;

FIG. 4(b) is a timing chart of the conventional conference trunk system;

FIG. 4 (c) is a timing chart of the conventional conference trunk system;

FIG. 4 (d) is a timing chart of the conventional conference trunk system;

FIG. 4 (e) is a timing chart of the conventional conference trunk system;

FIG. 5 (a) is a timing chart of the conventional conference trunk system;

FIG. 5 (b) is a timing chart of the conventional conference trunk system;

FIG. 6(a) is a timing chart of the conventional conference trunk system;

FIG. 6(b) is a timing chart of the conventional conference trunk system;

FIG. 6(c) is a timing chart of the conventional conference trunk system;

FIG. 6(d) is a timing chart of the conventional conference trunk system;

FIG. 6(e) is a timing chart of the conventional conference trunk system;

FIG. 13(a) is a timing chart of the digital conference trunk system of the invention;

FIG. 13(b) is a timing chart of the digital conference trunk system of the invention;

FIG. 13(c) is a timing chart of the digital conference trunk system of the invention;

FIG. 13(d) is a timing chart of the digital conference trunk system of the invention;

FIG. 13(e) is a timing chart of the digital conference trunk system of the invention;

FIG. 13(f) is a timing chart of the digital conference trunk system of the invention;

FIG. 14(a) is a timing chart of the digital conference trunk system of the invention;

FIG. 14(b) is a timing chart of the digital conference trunk system of the invention;

FIG. 14(c) is a timing chart of the digital conference trunk system of the invention;

FIG. 14(d) is a timing chart of the digital conference trunk system of the invention;

FIG. 14(e) is a timing chart of the digital conference trunk system of the invention;

FIG. 14(f) is a timing chart of the digital conference trunk system of the invention;

FIG. 15(a) is a timing chart of the digital conference trunk system of the invention;

FIG. 15(b) is a timing chart of the digital conference trunk system of the invention;

FIG. 15(c) is a timing chart of the digital conference trunk system of the invention;

FIG. 15(d) is a timing chart of the digital conference trunk system of the invention;

FIG. 15(e) is a timing chart of the digital conference trunk system of the invention;

FIG. 15(f) is a timing chart of the digital conference trunk system of the invention;

FIG. 16(a) is a timing chart of the digital conference trunk system of the invention;

FIG. 16(b) is a timing chart of the digital conference trunk system of the invention;

FIG. 16(c) is a timing chart of the digital conference trunk system of the invention;

FIG. 16(d) is a timing chart of the digital conference trunk system of the invention;

FIG. 16(e) is a timing chart of the digital conference trunk system of the invention;

FIG. 16(f) is a timing chart of the digital conference trunk system of the invention;

FIG. 17(a) is a timing chart of one time slot;

FIG. 17(b) is a timing chart of one time slot;

FIG. 17(c) is a timing chart of processing each division time of one time slot;

FIG. 18(a) is a timing chart of a timing signal generation means of the digital conference trunk system of the invention;

FIG. 18(b) is a timing chart of a timing signal generation means of the digital conference trunk system of the invention;

FIG. 18(c) is a timing chart of a timing signal generation means of the digital conference trunk system of the invention;

FIG. 18(d) is a timing chart of a timing signal generation means of the digital conference trunk system of the invention;

FIG. 18(e) is a timing chart of a timing signal generation means of the digital conference trunk system of the invention;

FIG. 18(f) is a timing chart of a timing signal generation means of the digital conference trunk system of the invention;

FIG. 18(g) is a timing chart of a timing signal generation means of the digital conference trunk system of the invention;

FIG. 18(h) is a timing chart of a timing signal generation means of the digital conference trunk system of the invention;

FIG. 18(i) is a timing chart of a timing signal generation means of the digital conference trunk system of the invention;

FIG. 18(j) is a timing chart of a timing signal generation means of the digital conference trunk system of the invention;

FIG. 18(k) is a timing chart of a timing signal generation means of the digital conference trunk system of the invention;

FIG. 18(l) is a timing chart of a timing signal generation means of the digital conference trunk system of the invention;

FIG. 18(m) is a timing chart of a timing signal generation means of the digital conference trunk system of the invention;

FIG. 18(n) is a timing chart of a timing signal generation means of the digital conference trunk system of the invention;

FIG. 18(o) is a timing chart of a timing signal generation means of the digital conference trunk system of the invention;

FIG. 18(p) is a timing chart of a timing signal generation means of the digital conference trunk system of the invention;

FIG. 18(q) is a timing chart of a timing signal generation means of the digital conference trunk system of the invention;

FIG. 18(r) is a timing chart of a timing signal generation means of the digital conference trunk system of the invention;

FIG. 19(a) is a timing chart of a timing signal generation means of the digital conference trunk system of the invention;

FIG. 19(b) is a timing chart of a timing signal generation means of the digital conference trunk system of the invention;

FIG. 19(c) is a timing chart of a timing signal generation means of the digital conference trunk system of the invention;

FIG. 19(d) is a timing chart of a timing signal generation means of the digital conference trunk system of the invention;

FIG. 19(e) is a timing chart of a timing signal generation means of the digital conference trunk system of the invention;

FIG. 19(f) is a timing chart of a timing signal generation means of the digital conference trunk system of the invention;

FIG. 19(g) is a timing chart of a timing signal generation means of the digital conference trunk system of the invention;

FIG. 19(h) is a timing chart of a timing signal generation means of the digital conference trunk system of the invention;

FIG. 19(i) is a timing chart of a timing signal generation means of the digital conference trunk system of the invention;

FIG. 19(j) is a timing chart of a timing signal generation means of the digital conference trunk system of the invention;

FIG. 19(k) is a timing chart of a timing signal generation means of the digital conference trunk system of the invention;

FIG. 19(l) is a timing chart of a timing signal generation means of the digital conference trunk system of the invention;

FIG. 19(m) is a timing chart of a timing signal generation means of the digital conference trunk system of the invention;

FIG. 19(n) is a timing chart of a timing signal generation means of the digital conference trunk system of the invention;

FIG. 19(o) is a timing chart of a timing signal generation means of the digital conference trunk system of the invention;

FIG. 19(p) is a timing chart of a timing signal generation means of the digital conference trunk system of the invention;

FIG. 19(q) is a timing chart of a timing signal generation means of the digital conference trunk system of the invention;

FIG. 19(r) is a timing chart of a timing signal generation means of the digital conference trunk system of the invention;

FIG. 20(a) is a timing chart of a timing signal generation means of the digital conference trunk system of the invention;

FIG. 20(b) is a timing chart of a timing signal generation means of the digital conference trunk system of the invention;

FIG. 20(c) is a timing chart of a timing signal generation means of the digital conference trunk system of the invention;

FIG. 20(d) is a timing chart of a timing signal generation means of the digital conference trunk system of the invention;

FIG. 20(e) is a timing chart of a timing signal generation means of the digital conference trunk system of the invention;

FIG. 20(f) is a timing chart of a timing signal generation means of the digital conference trunk system of the invention;

FIG. 20(g) is a timing chart of a timing signal generation means of the digital conference trunk system of the invention;

FIG. 20(h) is a timing chart of a timing signal generation means of the digital conference trunk system of the invention;

FIG. 20(i) is a timing chart of a timing signal generation means of the digital conference trunk system of the invention;

FIG. 20(j) is a timing chart of a timing signal generation means of the digital conference trunk system of the invention;

FIG. 20(k) is a timing chart of a timing signal generation means of the digital conference trunk system of the invention;

FIG. 20(l) is a timing chart of a timing signal generation means of the digital conference trunk system of the invention;

FIG. 20(m) is a timing chart of a timing signal generation means of the digital conference trunk system of the invention;

FIG. 20(n) is a timing chart of a timing signal generation means of the digital conference trunk system of the invention;

FIG. 20(o) is a timing chart of a timing signal generation means of the digital conference trunk system of the invention;

FIG. 20(p) is a timing chart of a timing signal generation means of the digital conference trunk system of the invention;

FIG. 20(q) is a timing chart of a timing signal general on means of the digital conference trunk system of the invention; and FIG. 20(r) is a timing chart of a timing signal generation means of the digital conference trunk system of the invention.

DESCRIPTION OF THE PREFERRED EMBODIMENTS

The invention will now be described below with reference to the drawings illustrative of preferred embodiments.

Figure 1:
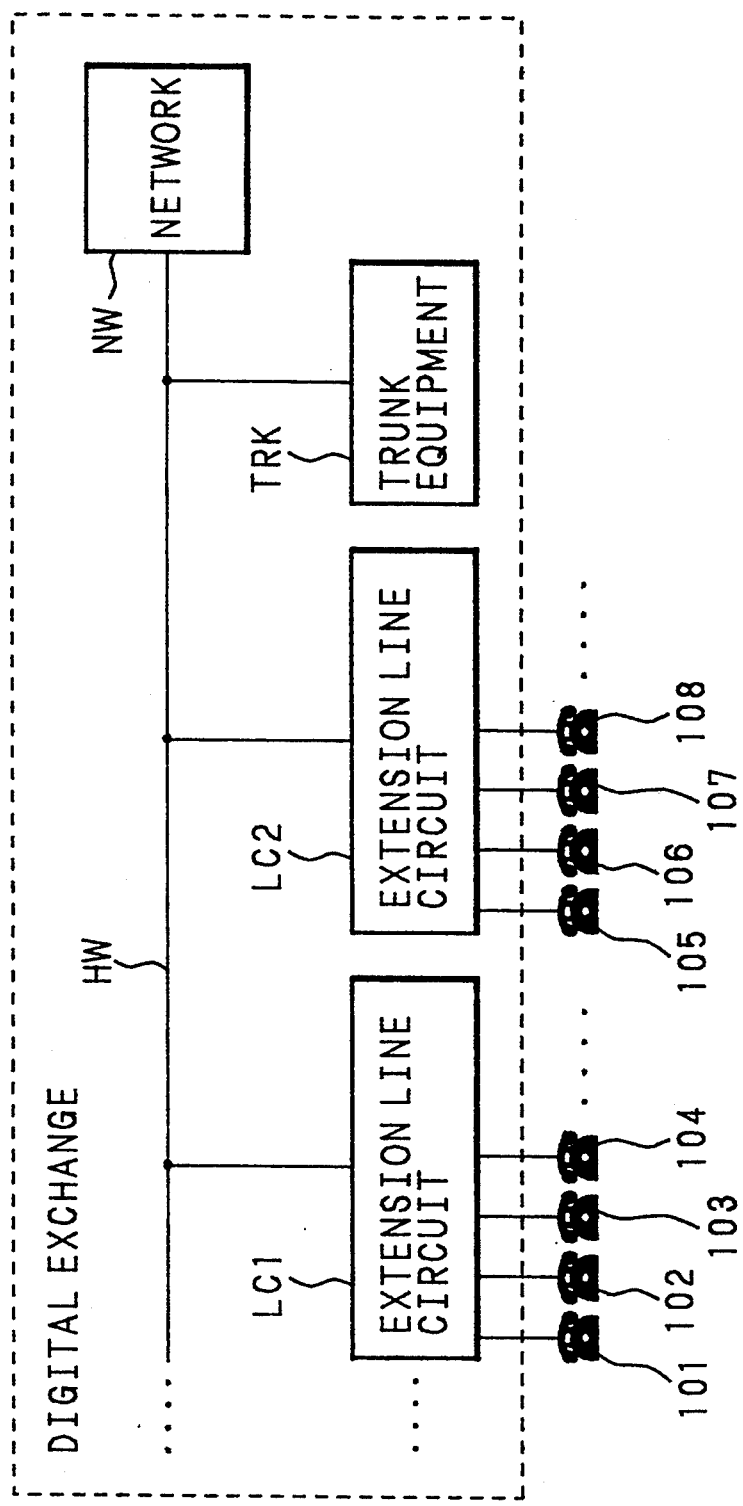
FIG. 1 is a block diagram illustrating the basic constitution of a digital exchange.
Figure 2:
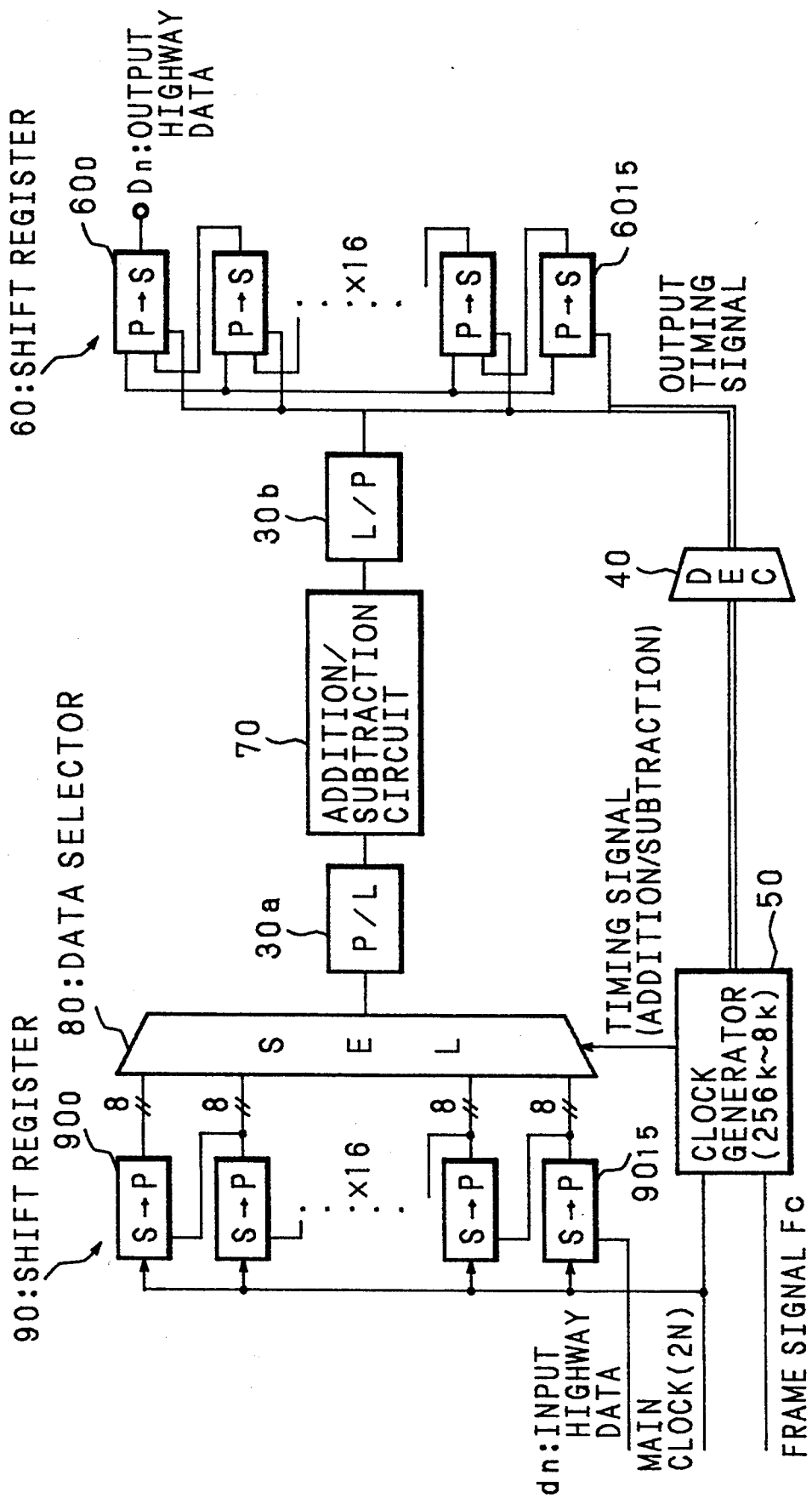
FIG. 2 is a block diagram of a conventional digital conference trunk system.
Figures 5A, 5B, 5C, 5D, 5E:
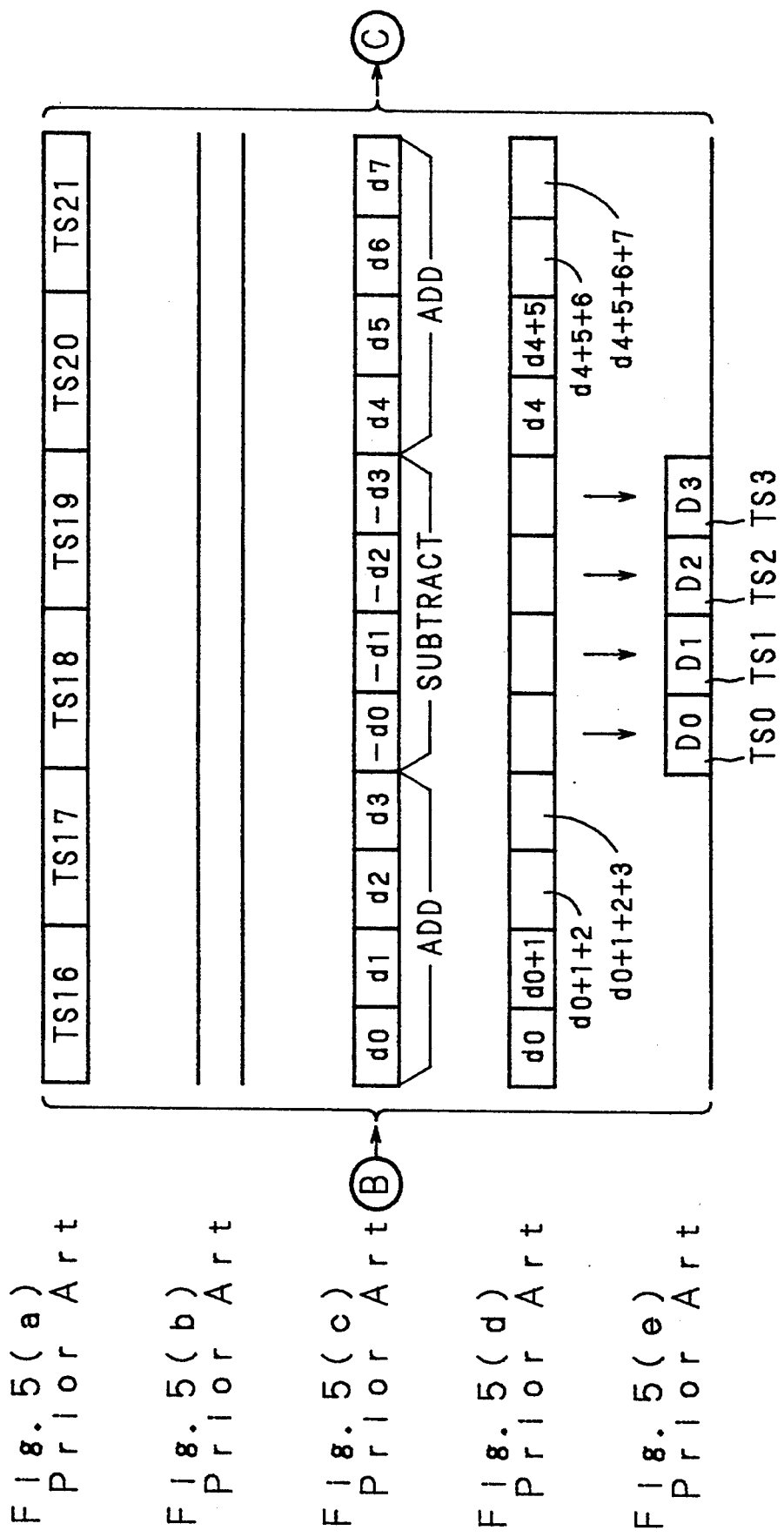
FIG. 5(c) is a timing chart of the conventional conference trunk system.
FIG. 5(d) is a timing chart of the conventional conference trunk system.
FIG. 5(e) is a timing chart of the conventional conference trunk system.
Figures 7A, 7B, 7C, 7D, 7E:
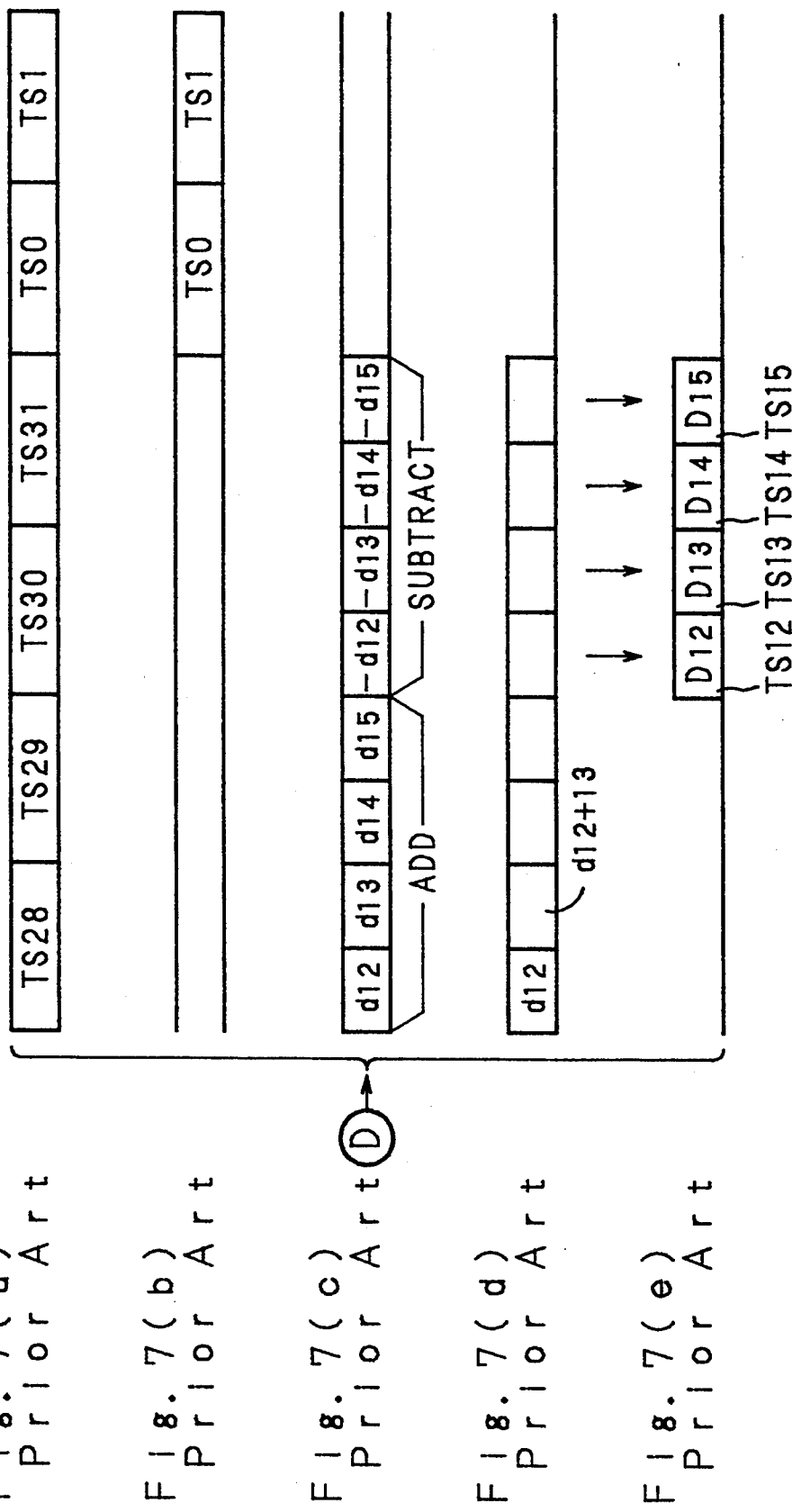
FIG. 7(a) is a timing chart of the conventional conference trunk system.
FIG. 7(b) is a timing chart of the conventional conference trunk system.
FIG. 7(c) is a timing chart of the conventional conference trunk system.
FIG. 7(d) is a timing chart of the conventional conference trunk system.
FIG. 7(e) is a timing chart of the conventional conference trunk system.
Figure 8:
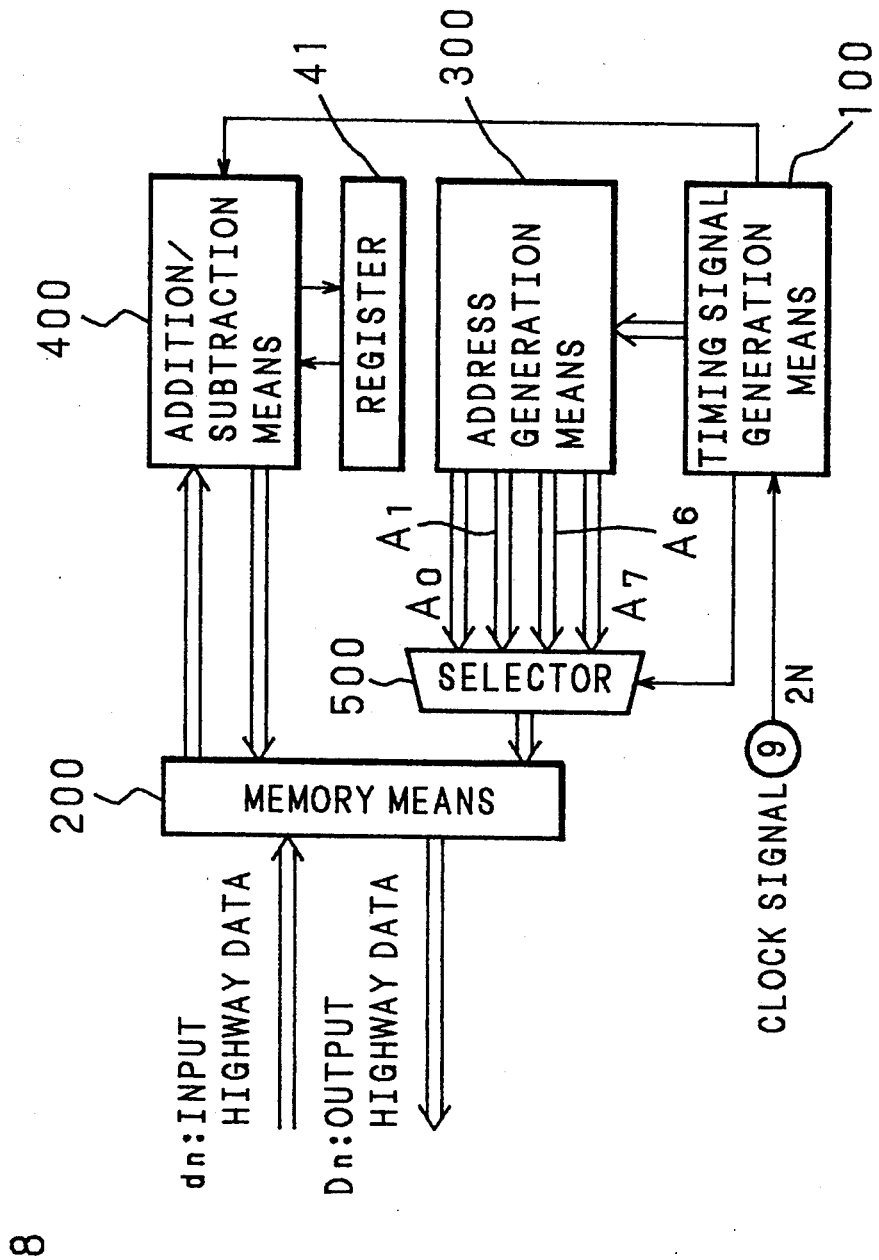
FIG. 8 is a block diagram explanatory of the principle of a digital conference trunk system of the invention.

FIG. 8 is a block diagram of a digital conference trunk system illustrative of the principle of the invention. The digital conference trunk system of the invention comprises a memory means 200 for temporarily storing the input highway data dn and the output highway data Dn used both as a memory for input and output, an address generation means 300 which generates write and read addresses $A_0$, $A_1$, $A_6$, $A_7$ of the memory means 200, an addition/subtraction means 400 which generates the output highway data Dn to be outputted in the time slot TSn by addition and subtraction of the highway data dn which is read From the memory means 200, and a timing signal generation means 100 which controls the operation timing of the memory means 200 and of the addition/subtraction means 400.

Figure 9:
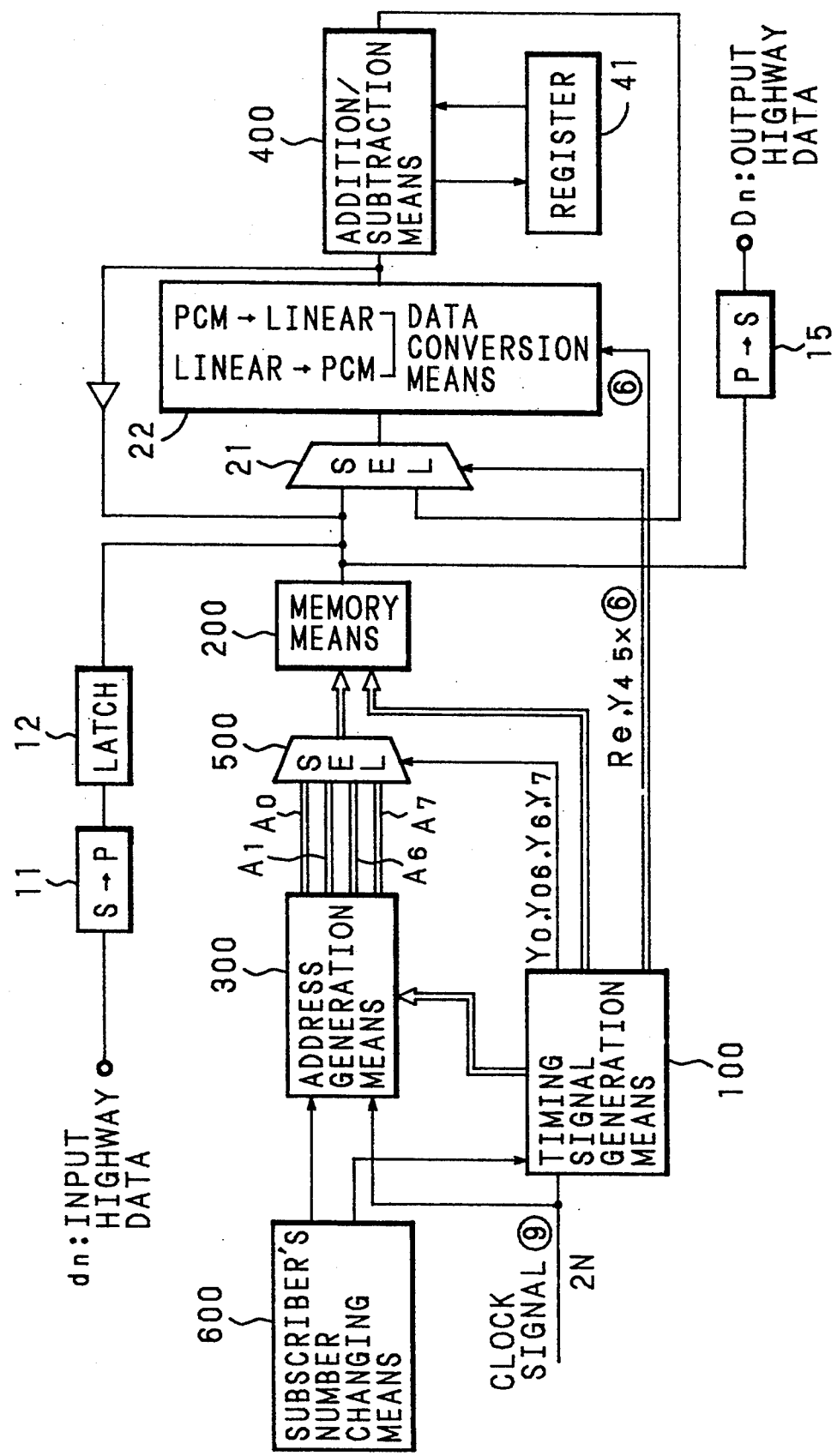
FIG. 9 is a block diagram illustrating an embodiment of a digital conference trunk system of the invention.

FIG. 9 is a block diagram illustrative of an embodiment of the invention. FIG. 13 through FIG. 16 are timing charts indicating an outline of the operation of the invention. FIG. 17 is an enlarged timing chart of one time slot.

The one time slot shown in FIG. 17 (a) has 8 times the period of the main clock signal CLK9 of frequency 2N (2MHz, for example) shown in FIG. 17 (b), with the first ⅛ division time being denoted as the 0th division time $t_0$, the second ⅛ division time being denoted as the 1st division time $t_1$, and the eighth ⅛ division time being denoted as the 7th division time $t_7$.

The input highway data dn (n is a suffix indicating the time slot number and is an integer from 0 to 15) is inputted to an S/P converter 11 in the order of the time slot numbers, to be converted from serial to parallel and tentatively latched in a latch circuit 12.

Then the data is stored at corresponding addresses $a_0$ through $a_{15}$ of the memory means 200 to the respective time slots $TS_n$ according to a write address $A_0$ to be described below, which is given by the address generation means 300 (the 0th division time $t_0$ in FIG. 13 through FIG. 17).

The input highway data dn which is written in the memory means 200 as described above is read by specified pieces P (where P is the number of circuits capable of simultaneously speaking in the digital conference system and P is four or eight in this embodiment) according to a read address $A_1$ given by the address generation means 300, sent via the selector 21 to the PCM/linear data conversion means (referred to as a data conversion means hereinafter) 22 where the input highway data is converted from PCM to linear, and is inputted to the addition/subtraction means 400.

The addition/subtraction means 400 first calculates da which is the sum of the specified pieces P of the input highway data dn (for example, $da = d_0 + d_1 + d_2 + d_3$), and temporarily stores the sum in the register 41. Subsequently, the output highway data Dn which corresponds to the time slot TSn ( for example, $D_0 = d_1 + d_2 + d_3, \ldots, D_3 = d_0 + d_1 + d_2$) is obtained. The output highway data Dn thus obtained is sent via the selector 21 to the data conversion means 22 to convert the output highway data Dn from linear to PCM (processed in the 1st division time $t_1$ through 5th division time $t_5$).

Then the data is stored in the memory means 200 in a write address $A_6$ which is given by the address generation means 300 (in the 6th division time $t_6$).

Figure 10:
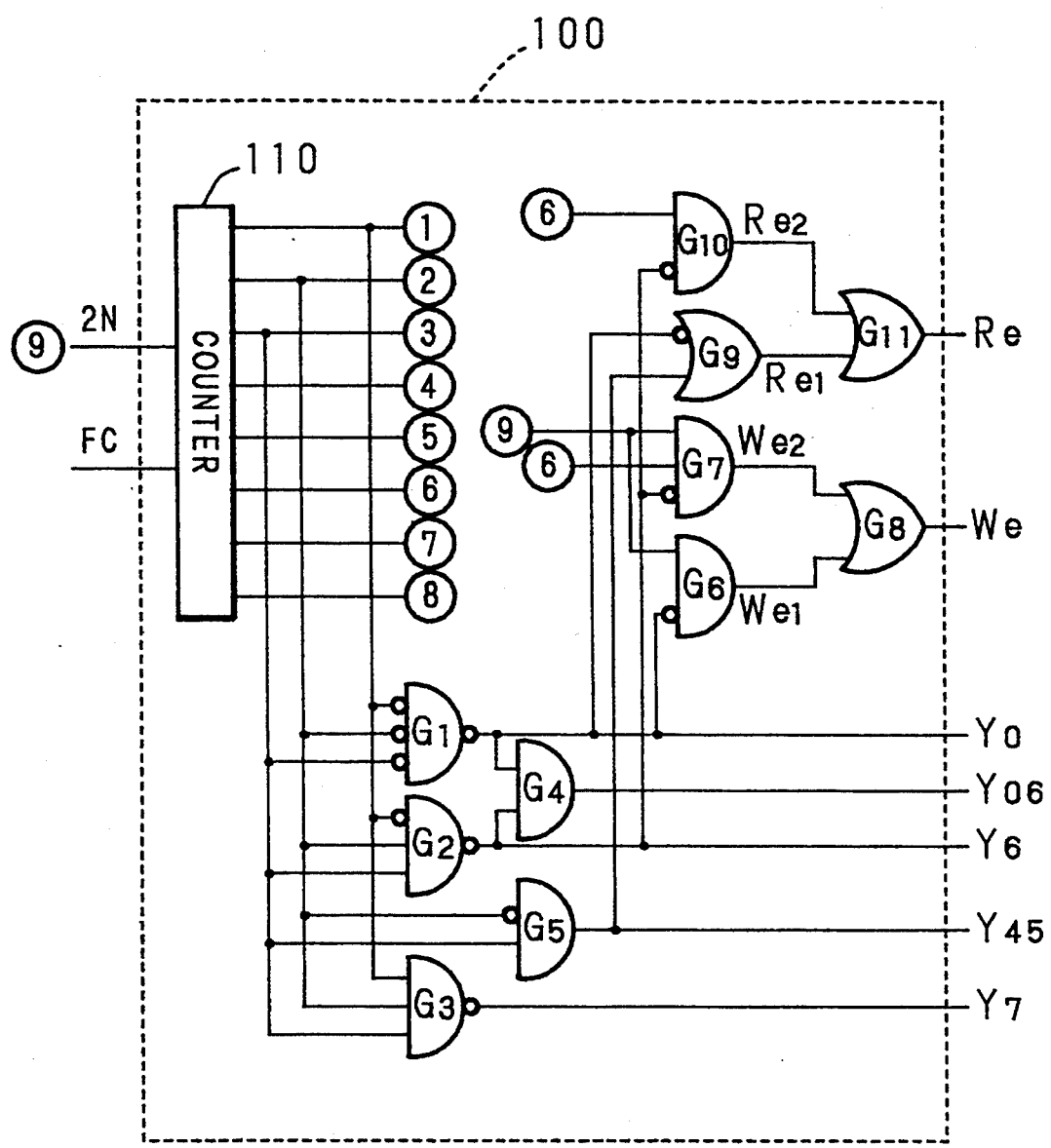
FIG. 10 is a block diagram of a timing signal generation means of FIGS. 8 and 9.

Finally, the data is read from the memory means 200 from a read address $A_7$ which is given by the address generation means 300, to be outputted after being converted to serial data by the P/S conversion means 15, FIG. 10 shows the detailed construction of the timing signal generation means 100 of the invention. FIG. 18 through FIG. 20 are detailed timing charts of the timing signal generation means 100.

As shown in FIG. 10, the timing signal generation means 100 generates; a gate signal $Y_0$ which supplies the write address $A_0$ to the memory means 200 in the 0th division time $t_0$ which is the first ⅛ division time of one time slot for the purpose of writing the input highway data dn to the memory means 200; a gate signal $Y_{06}$ which gives the read address $A_1$ to the memory means 200 for reading the input highway data dn from the memory means 200 for the purpose of adding/subtracting the input highway data dn in the 1st time slot $t_1$ through the 5th time slot $t_5$ to specify the time of addition/subtraction; a gate signal $Y_6$ which supplies the write address $A_6$ to the memory means 200 for writing the output highway data Dn which has been obtained as the result of the above addition/subtraction in the 6th division time $t_6$ of one time slot; and gate signal $Y_7$ which gives the read address $A_7$ to the memory means 200 for reading the output highway data Dn which has been written in the memory means 200 and sending out the output highway data Dn in the 7th division time $t_7$ of one time slot.

The timing signal generation means 100 is provided with a counter 110 which counts the main clock signal CLK9 having frequency 2N (for example, 2MHz: FIG. 18(a), FIG. 19(a), FIG. 20(a)) with eight times the period of one time slot (FIG. 18(c), FIG. 19(c), FIG. 20(c)), so that the clock signals CLK1 through CLK8 having the frequencies to be described below are obtained (FIGS. 18(d) through (k), FIGS. 19(d) through (k), FIGS. 20 (d) through (k)).

|  | BIT | FREQUENCY | CLK No. |
|---|---|---|---|
| FIG. 13(d) | bit 0 | N | CLK1 |
| FIG. 13(e) | bit 1 | $\frac{1}{2} \times N$ | CLK2 |
| FIG. 13(f) | bit 2 | $\frac{1}{4} \times N$ | CLK3 |
| FIG. 13(g) | bit 3 | $\frac{1}{8} \times N$ | CLK4 |
| FIG. 13(h) | bit 4 | $1/16 \times N$ | CLK5 |
| FIG. 13(i) | bit 5 | $1/32 \times N$ | CLK6 |
| FIG. 13(j) | bit 6 | $1/64 \times N$ | CLK7 |
| FIG. 13(k) | bit 7 | $1/128 \times N$ | CLK8 |

The following output signals are obtained from the outputs of the counter 110 as shown in FIG. 10 and TABLE 1. The gate signal $Y_0$ which supplies the write address $a_0$ to the memory means 200 is obtained in the 0th division time $t_0$ from the inverted signals of the clock signals CLK1, CLK2, CLK3 which are ANDed by an AND gate $G_1$. (FIG. 18(l), FIG. 19(l), FIG. 20(l)).

Similarly to he above, the gate signal $Y_6$ which gives the write address $A_6$ to the memory means 200 is obtained in the 6th division time $t_6$ after the addition/subtraction by inputting the clock signals CLK2, CLK3 and the inverted signal of the clock signal CLK 1 to an AND gate $G_2$, and further by inverting the output from the AND gate $G_2$ (FIG. 18(m), FIG. 19(m), FIG. 20(m)).

The gate signal $Y_7$ which supplies the read address $A_7$ to the memory means 200 is obtained in the 7th division time from inverting the ANDed clock signals CLK1, CLK2, CLK3 by an AND gate $G_3$ (FIG. 18(n), FIG. 19(n), FIG. 20(n)).

Further, the gate signal $Y_{06}$ which specifies the time of addition/subtraction (the 1st division time $t_1$ through the 5th division time $t_5$) is obtained from the ANDed gate signals $Y_0$ and $Y_6$ by an AND gate $G_4$ (FIG. 18(o), FIG. 19(o), FIG. 20(o)).

The gate signal $Y_{45}$ which specifies the time of processing after addition/subtraction, that is, the time of latching the added/subtracted value to the register 41, and converting the output highway data to PCM (the 4th and 5th division times) is obtained by AND operation of an AND gate $G_5$ between the inverted signal of the clock signal CLK2 and the clock signal CLK3 (FIG. 18(p), FIG. 19(p), FIG. 20(p)).

The addition/subtraction processing time comprises a period of addition $T_O$ in the first P time slots and a period of subtraction $T_1$ in the next P time slots. The write address $A_6$ is sufficient to be given in the period of the subtraction period $T_1$ after the subtraction.

The timing signal generation means 100 further generates a write signal We which consists of a 1st write signal $We_1$ for enabling the memory means 200 to be written in the 0th division time $t_0$ of every time slot, and a 2nd writing signal $We_2$ For enabling the memory means 200 to be written in the 6th division time $t_6$ of every time slot within the subtraction period $T_1$. The timing signal generation means 100 also generates a read signal Re for enabling the memory means 200 to be read by supplying the read addresses $A_1$, $A_7$ to the memory means 200 in a $\frac{1}{8}$ division time of every time slot at least other than the $\frac{1}{8}$ division time where the write signal We is being outputted.

More specifically, the 1st write signal $We_1$ is obtained from AND operation between the inverted gate signal $Y_0$ and the main clock signal CLK9 by a gate $G_6$ (FIG. 18(q), FIG. 19(q), FIG. 20(q)). The 2nd write signal $We_2$ is obtained from AND operation between the inverted gate signal $Y_6$ and the clock signal CLK6 by gate $G_7$. The write signal We is obtained from OR operation between the 1st and the 2nd write signals by a gate $G_8$. The 1st write signal $We_1$ is used for writing the input highway data dn to the memory means 200, and the 2nd write signal $We_2$ is for writing the output highway data Dn obtained by the addition/subtraction to the memory means 200.

The 1st read signal $Re_1$ is obtained from OR operation between the inverted gate signal $Y_0$ and the gate signal $Y_6$ by a gate $G_9$. The 2nd read signal $Re_2$ is obtained from AND operation between the inverted gate signal $Y_6$ and the clock signal CLK6 by a gate $G_{10}$. The read signal Re is obtained by OR operation between the 1st and 2nd read signals by a gate $G_{11}$ (FIG. 18(r), FIG. 19(r), FIG. 20(r)). The 1st read signal $Re_1$ enables the memory means 200 to be accessed during a time in the subtraction period $T_1$ other than the time of latching the sum da to the register 41 and converting the output highway data Dn. The 2nd read signal $Re_2$ inhibits the memory means 200 to be read while the 2nd write signal $We_2$ being generated.

The counter 110 is reset by a frame clock FC (FIG. 18(b), FIG. 19(b), FIG. 20(b)) which is outputted in every 32 time slots.

Figure 11:
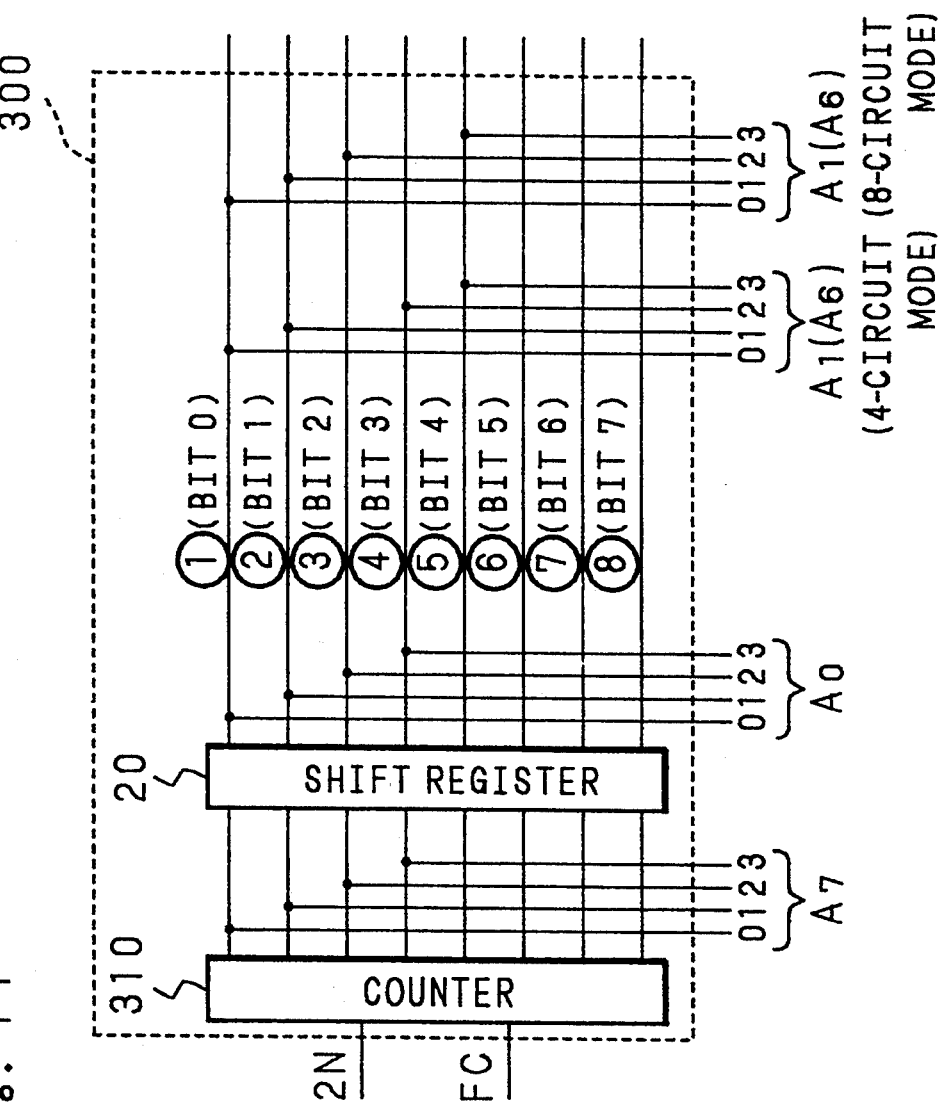
FIG. 11 is a block diagram of an address generation means of FIGS. 8 and 9.

FIG. 11 is a detailed diagram of the address generation means 300. As shown in FIG. 11, the address generation means 300 outputs the write address $A_0$ to write the input highway data dn to the memory means 200, the read address $A_1$ to read the input highway data dn from the memory means 200 for addition/subtraction, the write address $A_6$ to write the output highway data Dn which is obtained as a result of the addition/subtraction to the memory means 200, and the read address $A_7$ to read the written output highway data Dn from the memory means 200 to output the same. The address generation means 300 generates addresses by outputs from a counter 310 which receives the main clock signal CLK9 and is reset by the frame clock FC. Because the counter 310, upon shifting the outputs twice, becomes identical with the counter 110 of the timing signal generation means 100, it is a matter of course that these counters can be used in common.

Similarly to the above, tile counter 310 outputs clock signals CLK1 through CLK8, among which clock signals CLK1 through CLK5 are directly used as the address $A_7$ for reading the output highway data Dn, while the value lagged by two counts behind the read address $A_7$ (delayed by a shift register 20) is used as the write address $A_0$ for writing the input highway data dn to the memory means 200 (refer to TABLE 2, 'ordinary mode').

On the other hand, the address $A_1$ ($A_6$) which uses the clock signals CLK1, CLK2, CLK4, CLK5 among the clock signals CLK1 through CLK5 which constitute the address $A_0$, counts the same value twice every four times as shown in the case of '4-subscriber mode' in TABLE 2 (for example, counts 0 through 3 for the address $A_1$, again counts 0 through 3 for the address $A_6$, counts 4 through 7 for the address $A_1$, again counts 4 through 7 for the address $A_6$). Similarly, the address $A_1$ ($A_6$) which uses the clock signals CLK1, CLK2, CLK3, CLK5 among the clock signals CLK1 through CLK5 which constitute the address $A_0$, counts the same value twice every eight times shown in the case of '8-subscriber mode' in TABLE 2.

The addresses $A_0$, $A_1$, $A_6$, $A_7$ are inputted to the memory means 200 as will be described below by giving various gate signals to the selector 500 shown in FIG. 12.

Figure 12:
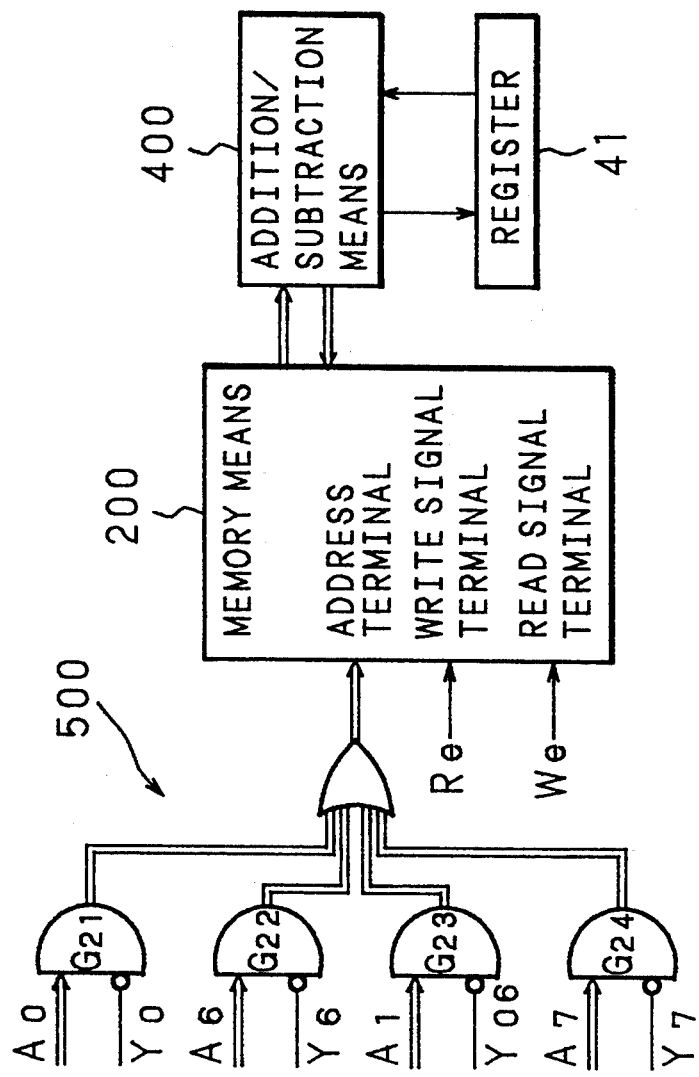
FIG. 12 is a block diagram including an area around a selector of FIGS. 8 and 9.

That is, the write address $A_0$ is sent to the memory means 200 via an AND gate $G_{21}$ which is controlled by the inverted gate signal $Y_0$ as shown in FIG. 12 (the 0th division time $t_0$). Since the write signal We is also inputted to the memory means 200 at this time, the input highway data dn ($d_0$, $d_1$, ..., $d_{15}$) which is latched by the latch means 12 as described above is written in the memory means 200 at the specified addresses ($a_0$ through $a_{15}$) which correspond to the respective time slots (FIG. 13(a), 14(a), FIG. 15(a), FIG. 16(a)).

Then, the address $A_1$ is supplied to the memory means 200 via an AND gate $G_{23}$ which is controlled by the inverted gate signal $Y_{06}$ during tile period from the 1st division time $t_1$ to the 5th division time $t_5$ of the time slots TS0 through TS3. Because the read signal Re is active during tile period from the 1st division time $t_1$ to the 3rd division time $t_3$, the input highway data $d_0$, $d_1$, $d_2$, $d_3$ stored in the memory means 200 at the respective addresses is read sequentially.

The input highway data dr, which is read as described above is inputted to the data conversion means 22 via the selector 21 where the input highway data is converted to linear data and is inputted to the addition/-subtraction means 400 (FIG. 13(b), FIG. 14(b), FIG. 15(b), FIG. 16(b)). P pieces of data (where P is the number of the circuits capable of simultaneously speaking in a conference system) are added/subtracted in the addition/subtraction means 400. Addition/subtraction processing is achieved in the addition period $T_O$ and in the subtraction period $T_1$. During the addition period $T_0$, P pieces of the input highway data read from the memory means 200 by supplying the address $A_1$ in the first P time slots, and during the subtraction period $T_1$, the output highway data Dn is obtained by subtracting each piece of the input highway data corresponding to each time slot from the added result in the next P time slots. In this embodiment, the sum $da = d_0 + d_1 + d_2 + d_3$ is obtained by sequentially adding the read out data $d_0$, $d_1$, $d_2$, $d_3$.

The sum da obtained as described above is temporarily stored in the register 41 provided in the addition/-subtraction means 400 in the 4th division time $t_4$ and the 5th division time $t_5$ specified by the gate signal $Y_{45}$ (time slot TS3 in FIG. 13(c), FIG. 14(c), FIG. 15(c), FIG. 16(c)). The 1st division time $t_1$ through the 5th division time $t_5$ of the time slots $TS_0$ through $TS_3$ constitute the addition period $T_0$.

In the 1st division time $t_1$ to the 3rd division time $t_3$ of the next four time slots TS4 through TS7, the address $A_1$ is also supplied to the memory means 200 to read the input highway data $d_0$, $d_1$, $d_2$, $d_3$ therefrom and each piece of the input highway data is complemented when being inputted to the addition/subtraction means 400. Then, the sum $da = d_0 + d_1 + d_2 + d_3$ obtained as described above and each complement $-d_0$, $-d_1$, $-d_2$, $-d_3$ are added to obtain the output highway data $D_O$ ($d_1 + d_2 + d_3$), $D_1(d_0 + d_2 + d_3)$, $D_2$ ($d_0 + d_1 + d_3$), $D_3$ ($d_0 + d_1 + d_3$) which correspond to the time slots TS0, TS1, TS2, TS3 (FIG. 13(d), FIG. 14(d), FIG. 15(d), FIG. 16(d)).

The output highway data Dn obtained as described above is inputted to the data conversion means 22 where it is converted to PCM data via the selector 21 (the 4th and the 5th time slots $t_4$, $t_5$). The 1st division time $t_1$ through the 5th division time $t_5$ of the time slots TS4 through TS7 constitute the subtraction period $T_1$.

Then, the address $A_6$ is supplied to the memory means 200 via the AND gate $G_{22}$ which is controlled by the inverted gate signal $Y_6$ memory means 200 during the 6th division time $t_6$, and the second write signal $We_2$ is also supplied to the memory means 200 in the 6th division time of the subtraction period $T_1$. Consequently, the output highway data $D_O$ through $D_3$ is written to the memory means 200 at the specified addresses (FIG. 13(e), FIG. 14(e), FIG. 15(e), FIG. 16(e)).

The output highway data $D_0$, $D_1$, $D_2$, $D_3$ is read by the read address $A_7$ which is supplied to the memory means 200 in the 7th division time via the gate $G_{24}$ which is controlled by the inverted gate signal $V_7$, and is outputted in the respective slots TS0, TS1, TS2, TS3 (FIG. 13(f), FIG. 14(f), FIG. 15(f), FIG. 16(f)). However, the output highway data $D_0$, $D_1$, ... obtained in the slots TS4, TS5, ... is read in the slots after TS30.

When the data of the four time slots is processed, the data of eight slots is stored in the memory means 200. Thus the read address A1 is supplied to the memory means 200 in the 1st and 2nd division, time of each time slot, and four pieces of the input data $d_4$, $d_5$, $d_6$, $d_7$ of the subsequent four time slots TS4, TS5, TS6, TS7 are added and subtracted as above to obtain the outpost highway data $D_4$, $D_5$, $D_6$, $D_7$.

The output highway data $D_4$ through $D_7$ is then written in the memory means 200 at the write address $A_6$, and is later read from the memory means 200 at the read address $A_7$.

The above processes are repeated on the input highway data $d_O$ through $d_{15}$ of the time slots TS0 through TS15, and processing of the entire input highway data $d_O$ through $d_{15}$ requires a time length of 32 time slots.

The timing signal generation means 100 also generates control signals of the selector 21. That is, the selector 21 selects the memory means 200 by the read signal Re when the input highway data dn is inputted to the data conversion means 22 from the memory means, and selects the data conversion means 22 by the ANDed gate signal $Y_{45}$ and clock signal CLK6 when the output highway data Dn is input Led to the data conversion means 22 from the addition/subtraction means 400. The data conversion means 22 is controlled by the clock signal CLK6 to switch the addition period $T_O$ and the subtraction period $T_1$.

As a practical matter, two of such units as described above are provided, so that the highway data of the time slots 0 through 15 is processed in one unit while the highway data of the time slots 16 through 31 is processed in the other unit.

Although the above description is for the 4-subscriber mode, operation in the 8-subscriber mode proceeds similarly. In the 8-subscriber mode, the clock signals CLK1, CLK2, CLK3, CLK5 from the write address $A_0$ are used during addition and subtraction, and the address $A_1$ ($A_6$) based on double counting every eight Limes as shown in '8-subscriber mode' of TABLE 2. This provides a trunk circuit which is capable of processing the input and output highway data in the unit of 8 pieces.

The 4-subscriber mode and the 8-subscriber mode can be easily switched by changing the address $A_1$ ($A_6$) generation mode to the 4-scriber mode or to the 8-scriber mode in TABLE 2 by subscriber's number changing means 600 shown in FIG. 9. However, when operating in the 8-subscriber mode, the clock signal CLK7 is used instead of the clock signal CLK6 for switching in FIG. 9, FIG. 10.

To construct a conference trunk of the 4-circuit mode, a set of four of the address $A_1$ and a set of four of the address $A_6$, for the addition and subtraction are generated twice, respectively (the first four are the read address $A_1$, the second four are the write address $A_6$) while the main write addresses $A_0$ is generated eight times. To constitute a conference trunk of the 8-circuit mode, on the other hand, a set of eight of the address $A_1$ a set of eight of the address $A_6$, For the addition and subtraction are generated twice, respectively, While the main write address $A_0$ is generated sixteen times.

The address generation modes can be easily changed by selecting the output bits of the address counter 310 as shown in FIG. 11 and TABLE 1.

As for the methods of converting PCM data to linear data, there are the $\mu$-Law and the a-Law. The apparatus can be applied to either method by storing two types of data in the data conversion means 22.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| OUTPUT SIGNAL | INPUT SIGNAL | GATE |
| --- | --- | --- |
| $\overline{Y_0}$ | $\overline{CLK1} \times \overline{CLK2} \times \overline{CLK3}$ | $G_1$ |
| $\overline{Y_6}$ | $\overline{CLK1} \times CLK2 \times CLK3$ | $G_2$ |
| $\overline{Y_5}$ | $CLK1 \times CLK2 \times CLK3$ | $G_3$ |
| $Y_{06}$ | $Y_0 \times Y_6$ | $G_4$ |
| $Y_{45}$ | $\overline{CLK2} \times CLK3$ | $G_5$ |
| $We_1$ | $\overline{Y_0} \times CLK9$ | $G_6$ |
| $We_2$ | $\overline{Y_6} \times CLK6 \times CLK9$ | $G_7$ |
| $We$ | $We_1 + We_2$ | $G_8$ |
| $Re_1$ | $\overline{Y_0} \times Y_{45}$ | $G_9$ |
| $Re_2$ | $\overline{Y_6} \times CLK6$ | $G_{10}$ |
| $Re$ | $Re_1 + Re_2$ | $G_{11}$ |

TABLE 2

| ORDINARY MODE | | | | | | 4-SUBSCRIBER MODE | | | | | | |
| --- | --- | --- | --- | --- | --- | --- | --- | --- | --- | --- | --- | --- |
| | bit | | | | | | | bit | | | | |
| DECIMAL | ⑤ 4 | ④ 3 | ③ 2 | ② 1 | ① 0 | DECIMAL | 4 | ⑤ 3 | ④ 2 | ② 1 | ① 0 | |
| 0 | 0 | 0 | 0 | 0 | 0 | 0 | 0 | 0 | 0 | 0 | 0 | ⎫ |
| 1 | 0 | 0 | 0 | 0 | 1 | 1 | 0 | 0 | 0 | 0 | 1 | ⎬ $A_1$ |
| 2 | 0 | 0 | 0 | 1 | 0 | 2 | 0 | 0 | 0 | 1 | 0 | |
| 3 | 0 | 0 | 0 | 1 | 1 | 3 | 0 | 0 | 0 | 1 | 1 | ⎭ |
| 4 | 0 | 0 | 1 | 0 | 0 | 0 | 0 | 0 | 0 | 0 | 0 | ⎫ |
| 5 | 0 | 0 | 1 | 0 | 1 | 1 | 0 | 0 | 0 | 0 | 1 | ⎬ $A_6$ |
| 6 | 0 | 0 | 1 | 1 | 0 | 2 | 0 | 0 | 0 | 1 | 0 | |
| 7 | 0 | 0 | 1 | 1 | 1 | 3 | 0 | 0 | 0 | 1 | 1 | ⎭ |
| 8 | 0 | 1 | 0 | 0 | 0 | 4 | 0 | 0 | 1 | 0 | 0 | ⎫ |
| 9 | 0 | 1 | 0 | 0 | 1 | 5 | 0 | 0 | 1 | 0 | 1 | ⎬ $A_1$ |
| 10 | 0 | 1 | 0 | 1 | 0 | 6 | 0 | 0 | 1 | 1 | 0 | |
| 11 | 0 | 1 | 0 | 1 | 1 | 7 | 0 | 0 | 1 | 1 | 1 | ⎭ |
| 12 | 0 | 1 | 1 | 0 | 0 | 4 | 0 | 0 | 1 | 0 | 0 | ⎫ |
| 13 | 0 | 1 | 1 | 0 | 1 | 5 | 0 | 0 | 1 | 0 | 1 | ⎬ $A_6$ |
| 14 | 0 | 1 | 1 | 1 | 0 | 6 | 0 | 0 | 1 | 1 | 0 | |
| 15 | 0 | 1 | 1 | 1 | 1 | 7 | 0 | 0 | 1 | 1 | 1 | ⎭ |
| 16 | 1 | 0 | 0 | 0 | 0 | 8 | 0 | 1 | 0 | 0 | 0 | ⎫ |
| 17 | 1 | 0 | 0 | 0 | 1 | 9 | 0 | 1 | 0 | 0 | 1 | ⎬ $A_1$ |
| 18 | 1 | 0 | 0 | 1 | 0 | 10 | 0 | 1 | 0 | 1 | 0 | |
| 19 | 1 | 0 | 0 | 1 | 1 | 11 | 0 | 1 | 0 | 1 | 1 | ⎭ |
| 20 | 1 | 0 | 1 | 0 | 0 | 8 | 0 | 1 | 0 | 0 | 0 | ⎫ |
| 21 | 1 | 0 | 1 | 0 | 1 | 9 | 0 | 1 | 0 | 0 | 1 | ⎬ $A_6$ |
| 22 | 1 | 0 | 1 | 1 | 0 | 10 | 0 | 1 | 0 | 1 | 0 | |
| 23 | 1 | 0 | 1 | 1 | 1 | 11 | 0 | 1 | 0 | 1 | 1 | ⎭ |
| 24 | 1 | 1 | 0 | 0 | 0 | 12 | 0 | 1 | 1 | 0 | 0 | ⎫ |
| 25 | 1 | 1 | 0 | 0 | 1 | 13 | 0 | 1 | 1 | 0 | 1 | ⎬ $A_1$ |
| 26 | 1 | 1 | 0 | 1 | 0 | 14 | 0 | 1 | 1 | 1 | 0 | |
| 27 | 1 | 1 | 0 | 1 | 1 | 15 | 0 | 1 | 1 | 1 | 1 | ⎭ |
| 28 | 1 | 1 | 1 | 0 | 0 | 12 | 0 | 1 | 1 | 0 | 0 | ⎫ |
| 29 | 1 | 1 | 1 | 0 | 1 | 13 | 0 | 1 | 1 | 0 | 1 | ⎬ $A_6$ |
| 30 | 1 | 1 | 1 | 1 | 0 | 14 | 0 | 1 | 1 | 1 | 0 | |
| 31 | 1 | 1 | 1 | 1 | 1 | 15 | 0 | 1 | 1 | 1 | 1 | ⎭ |

| 8-SUBSCRIBER MODE | | | | | |
| --- | --- | --- | --- | --- | --- |
| | bit | | | | |
| DECIMAL | 4 | ⑤ 3 | ③ 2 | ② 1 | ① 0 |
| 0 | 0 | 0 | 0 | 0 | 0 |
| 1 | 0 | 0 | 0 | 0 | 1 |
| 2 | 0 | 0 | 0 | 1 | 0 |
| 3 | 0 | 0 | 0 | 1 | 1 |

TABLE 2-continued

| | | | | | | |
|---|---|---|---|---|---|---|
| 4 | 0 | 0 | 1 | 0 | 0 | }  $A_1$ |
| 5 | 0 | 0 | 1 | 0 | 1 | |
| 6 | 0 | 0 | 1 | 1 | 0 | |
| 7 | 0 | 0 | 1 | 1 | 1 | |
| 0 | 0 | 0 | 0 | 0 | 0 | }  $A_6$ |
| 1 | 0 | 0 | 0 | 0 | 1 | |
| 2 | 0 | 0 | 0 | 1 | 0 | |
| 3 | 0 | 0 | 0 | 1 | 1 | |
| 4 | 0 | 0 | 1 | 0 | 0 | |
| 5 | 0 | 0 | 1 | 0 | 1 | |
| 6 | 0 | 0 | 1 | 1 | 0 | |
| 7 | 0 | 0 | 1 | 1 | 1 | |
| 8 | 0 | 1 | 0 | 0 | 0 | }  $A_1$ |
| 9 | 0 | 1 | 0 | 0 | 1 | |
| 10 | 0 | 1 | 0 | 1 | 0 | |
| 11 | 0 | 1 | 0 | 1 | 1 | |
| 12 | 0 | 1 | 1 | 0 | 0 | |
| 13 | 0 | 1 | 1 | 0 | 1 | |
| 14 | 0 | 1 | 1 | 1 | 0 | |
| 15 | 0 | 1 | 1 | 1 | 1 | |
| 8 | 0 | 1 | 0 | 0 | 0 | }  $A_6$ |
| 9 | 0 | 1 | 0 | 0 | 1 | |
| 10 | 0 | 1 | 0 | 1 | 0 | |
| 11 | 0 | 1 | 0 | 1 | 1 | |
| 12 | 0 | 1 | 1 | 0 | 0 | |
| 13 | 0 | 1 | 1 | 0 | 1 | |
| 14 | 0 | 1 | 1 | 1 | 0 | |
| 15 | 0 | 1 | 1 | 1 | 1 | |

What is claimed is:

1. A digital conference trunk system operated in conjunction with a network and which receives input highway data inputted from a plurality of circuits via a highway in time slots respectively allocated to the circuits, and processes each of the input highway data of the time slots to generate output highway data for each circuit and output the output highway data, said system comprising:

an input for inputting the input highway data from said plurality of circuits;

an output for outputting the output highway data of said plurality of circuits;

a single input/output memory coupled to both said input and said output so that said memory receives and temporarily stores the input highway data of said plurality of circuits;

address generating means, coupled to said memory, for generating write addresses and read addresses for said memory;

addition/subtraction means, coupled to said memory, for adding and subtracting the input highway data read from the memory so as to obtain a sum of the input highway data and thereby to generate the output highway data of said plurality of circuits, said addition/subtraction means transferring the generated output highway data to said input/output memory so that said single input/output memory receives and temporarily stores the output highway data of said plurality of circuits and transmits said output highway data of said plurality of circuits to said output; and means, coupled to said address generating means and to said single input/output memory, for generating timing signals to control supplying of said write and read addresses to said memory, the timings of writing and reading of data to and from said memory and the operation timing of the addition/subtraction means.

2. A digital conference trunk system as claimed in claim 1, wherein the address generation means is provided with an address counter which is reset at specified intervals and a shaft register which shifts the output bit from the address counter, and generates a first write address ($A_0$) to write the input highway data to the memory, a first read address ($A_1$) to read the input highway data from the memory for adding and subtracting the input/highway data, a second write address ($A_6$) to write the output highway data for each circuit obtained by the addition and subtraction on the memory, and a second read address ($A_7$) to read the output highway data for each circuit from the memory.

3. A digital conference trunk system as claimed in claim 1, wherein the timing signal generation means causes the addition/subtraction means to read from the memory to add P pieces of the input highway data, P being a positive integer corresponding to the number of the circuits which can attend a conference supported by the digital conference trunk system, in an addition period over first predetermined time slots subtracts the input highway data of each circuit from the added sum to generate P pieces of the output highway data in a subtraction period over the next predetermined time slots.

4. A digital conference trunk system as claimed in claim 3, wherein each time slot is divided into eight division time periods and the timing signal generation means includes means to generate:

a first gate signal ($Y_0$) for supplying the write address to the memory in a first division time period of each time slot, for writing the input highway data of each circuit to the memory;

a second gate signal ($Y_{06}$) for supplying the read address to the memory to read the input highway data from the memory for addition and subtraction of the input highway data in a second through a sixth division time periods of each time slot within the addition period, and for controlling an addition time or a subtraction time of the input highway data which is read from the memory;

a third gate signal ($Y_6$) for supplying the write address to the memory for writing the output highway data, obtained as a result of the addition and subtraction, in seventh division time period of each time slot within the subtraction period; and a fourth gate signal ($Y_7$) for supplying the read address to the memory for reading the output highway data from the memory in an eighth division time period of each time slot within the subtraction period.

5. A digital conference trunk system as claimed in claim 4, wherein the timing signal generation means includes means to generate:

a first write enable signal which enables the memory to be written in the first division time period of each time slot;

a second write enable signal which enables the memory to be written in the seventh division time period of each time slot within the subtraction period; and a read enable signal which enables the memory to be read in a division time period of each time slot other than the division time period during which the first and second write enable signals are being outputted.

6. A digital conference trunk system as claimed in claim 1, further comprising;

means for changing the number of time slots to be added and subtracted according to the number of circuits which can attend a conference supported by the digital conference trunk system.

7. A digital conference trunk system as claimed in claim 6, wherein the changing means changes the number of time slots by selecting output bits from an address counter to change an address generation mode.

* * * * *